(12) United States Patent
Poberezhskiy et al.

(10) Patent No.: US 7,831,002 B2
(45) Date of Patent: Nov. 9, 2010

(54) SYSTEM, APPARATUS AND METHOD FOR SYNCHRONIZING A SPREADING SEQUENCE TRANSMITTED DURING A PLURALITY OF TIME SLOTS

(75) Inventors: Yefim S. Poberezhskiy, Thousand Oaks, CA (US); Igor Elgorriaga, Los Angeles, CA (US); Xinyu Wang, Newbury Park, CA (US)

(73) Assignee: The Boeing Company, Chicago, IL (US)

( * ) Notice: Subject to any disclaimer, the term of this patent is extended or adjusted under 35 U.S.C. 154(b) by 1064 days.

(21) Appl. No.: 11/546,877

(22) Filed: Oct. 11, 2006

(65) Prior Publication Data

US 2008/0089394 A1    Apr. 17, 2008

(51) Int. Cl.
*H04L 7/00* (2006.01)

(52) U.S. Cl. .................. 375/356; 375/354; 375/130; 375/219; 327/141; 370/503

(58) Field of Classification Search .......... 375/356, 375/354, 130, 219; 327/141; 370/503
See application file for complete search history.

(56) References Cited

U.S. PATENT DOCUMENTS

| | | | |
|---|---|---|---|
| 5,260,967 A * | 11/1993 | Schilling ............ | 370/342 |
| 5,488,631 A | 1/1996 | Gold et al. | |
| 5,619,524 A | 4/1997 | Ling et al. | |
| 5,748,147 A * | 5/1998 | Bickley et al. ........ | 342/457 |
| 5,867,525 A | 2/1999 | Giallorenzi et al. | |
| 6,674,790 B1 | 1/2004 | Rasmussen et al. | |
| 2005/0005205 A1 | 1/2005 | Shiue et al. | |
| 2005/0068932 A1 | 3/2005 | Lakkis | |
| 2008/0159202 A1* | 7/2008 | Hang .................. | 370/324 |

OTHER PUBLICATIONS

Olavarrieta, Liliana Diaz; "Wireless Communications Education: A Guide to Important Topics"; Microwave Review, Nov. 2005; pp. 51-57.

* cited by examiner

*Primary Examiner*—David C Payne
*Assistant Examiner*—Zewdu Kassa
(74) *Attorney, Agent, or Firm*—Law Office of Donald D. Mondul

(57) ABSTRACT

A system for synchronizing a spreading sequence transmitted during a plurality of time slots includes a plurality of communication stations. Each communication station includes: (a) a control unit; (b) a spreading sequence unit for originating the spreading sequence; (c) at least one of a transmitter and a receiver; (d) at least one delay unit responding to the control unit for imparting a first delay to the spreading sequence presented to the transmitter unit and responding to the receiver unit for imparting a second delay to the spreading sequence presented to the receiver unit; and (e) a synchronizing sequence generator coupled with the transmitter unit. The synchronizing sequence unit in a first station presents a synchronizing sequence for transmission accompanying spread information transmitted during selected time slots. A receiver unit in a second station employs the synchronizing sequence in cooperation with the spreading sequence for despreading received spread information.

20 Claims, 8 Drawing Sheets

SYSTEM, APPARATUS AND METHOD FOR SYNCHRONIZING A SPREADING SEQUENCE TRANSMITTED DURING A PLURALITY OF TIME SLOTS

BACKGROUND OF THE INVENTION

The present invention is directed to communication systems employing a spreading sequence for spreading transmitted information and for despreading received information. Such communication systems are sometimes referred to as employing spread spectrum techniques. One example of such a communication system is a communication system employing Direct Sequence Spread Spectrum (DSSS) techniques. The present invention is particularly useful in synchronizing communications for effecting spreading and despreading in successive time slots in a Time Division Multiple Access (TDMA) communication system employing spread spectrum techniques, including DSSS techniques.

Spread spectrum signals are used in commercial and military communication systems because they enable reliable and secure exchange of information between parties in harsh communication environments (e.g., environments having multipath propagation, intentional and unintentional jamming or other problems) while providing efficient use of the radio spectrum. Spread spectrum communications distributes a transmitted signal over a wide range of frequencies so that the power spectral density of the transmitted signals is relatively low. Designated receivers then can despread a received spread spectrum signal because the structure of the spreading sequence is known. The despread signals are demodulated, decoded, and, if necessary, decrypted. Properly performed spreading facilitates coping with multipath propagation and jamming. The relatively low power spectral density of the transmitted spread spectrum signals decreases probability of signal detection and interception, reduces interference with other signals transmitted in the same frequency band, and allows code division multiplexing.

In a direct sequence spread spectrum (DSSS) communication system, achieving high security of communications requires employment of a complex-valued virtually infinite nonlinear nonrecurrent pseudonoise (NN PN) sequence for spreading transmitted data. Such a complex-valued NN PN sequence (hereinafter referred to as a "spreading sequence") is often comprised of two independent, real-valued NN PN sequences. One of the sequences is an in-phase (I) component and the other sequence is a quadrature (Q) component. A generator of such a complex-valued spreading sequence is a very expensive device.

There are many situations, in which it is reasonable to use Time Division Multiple Access (TDMA) communications. TDMA means that a number of users share the same frequency band by assigning this band to each user for a short duration of time called a time slot. The time slots are grouped into frames. The frame structure repeats, so that a user can operate (transmit and receive information) within one or more assigned time slots in each frame. TDMA may be employed to increase traffic volume that can be handled by a communication system. Capacity of a TDMA system may be further increased, for example, when directional antennas are used. This is an implementation of Space Division Multiple Access (SDMA) that adds to capacity of a TDMA system and significantly simplifies communication protocols.

Combined use of spread spectrum transmissions, directional antennas, and TDMA provides very effective and efficient utilization of available spectrum and transmitter power. Use of such a combination of technologies also further decreases probabilities of detection and interception of the signal and radically improves antijamming capabilities of a communication system. There are, however, some problems related to TDMA spread spectrum communications.

One problem associated with TDMA spread spectrum communication systems is related to the time and reliability of synchronization. A virtually infinite NN PN spreading sequence is the only type of spreading sequence presently used for data spreading that has proven to be unexploitable by an interceptor. Such resistance to interception is due at least in part to a requirement that alignment (synchronization) of incoming and reference NN PN spreading sequences is absolutely necessary for proper functioning of a spread spectrum communication system. In a TDMA spread spectrum communication system, this alignment has to be performed during each time slot. Conventional methods for effecting the required alignment have to date required significant time and very expensive equipment to implement. This has proven so at least in part because the conventional methods use a section of the spreading sequence for establishing the required alignment.

It is preferred that synchronization (alignment) time should not exceed a small fraction of the slot length or duration. If too long a duration is required for establishing synchronization, an acceptable throughput of a TDMA spread spectrum communication system cannot be achieved. Further, synchronization equipment that is expensive and complex can make a communication system commercially noncompetitive. Virtually all attempts to reduce synchronization time and complexity of synchronization equipment using conventional methods, apparatus, and systems have so far lead to insufficient reliability of synchronization.

Another problem associated with TDMA spread spectrum communication systems is related to the length of guard intervals, which are necessary in each time slot. The reason for the first or leading guard interval in a time slot relates to clock uncertainties among various communicating stations in a communication system or network. Reference clocks of all stations that constitute a network or can potentially join a network are usually periodically (for example, with period of 1 second) synchronized by signals of the global positioning system (GPS). Despite such periodic synchronization, there is still time uncertainty among stations for many reasons. The largest component of the time uncertainty is commonly caused by differing frequency drifts of the various communication stations' reference oscillators. Because of the resulting time uncertainty among various stations, a transmitter cannot start transmitting immediately at the beginning of a time slot without risking a receiving station missing transmitted information. To avoid a loss of information transmitted during a time slot, a transmitting station should start transmitting (according to its own clock) only after the end of a first or leading guard interval that exceeds the maximum possible time uncertainty among clocks of the various stations. A corresponding receiver should start reception immediately at the beginning of the time slot (according to its own clock) when distance between transmitter and receiver is unknown. A corresponding receiver should start reception at a delayed time after the beginning of the time slot when distance between transmitter and receiver is known. The delay should be equal to propagation time (according to the receiver's own clock). Propagation time is, of course, related to the distance between transmitter and receiver.

A second or ending guard interval at the end of a time slot is necessary for accommodating signal propagation time and clock uncertainties among various communicating stations in a communication system or network. A transmitter should stop transmitting before the end of a time slot to take into account propagation time of a transmitted signal and time uncertainty among clocks of the various stations. If a transmitter transmits until the end of a time slot, a signal transmitted during a first time slot could reach a receiver at the beginning of the next succeeding time slot, or a signal transmitted at the end of a first time slot according to the clock of a transmitting station could be transmitted at the beginning of the next succeeding time slot according to the clock of a receiving station. When distance between transmitter and receiver is unknown, the second or ending guard interval should be established as sufficiently long to accommodate the maximum possible propagation time a transmitted signal may take to travel from a transmitter station to a receiver station. Knowledge of the distance between transmitter and receiver allows reduction of the second guard interval so long as the distance is not a maximum.

When the first (leading) and second (lagging) guard intervals are significant compared to the length of the time slot, throughput of the communication system is substantially reduced. Conversely, reduction of the guard intervals is important for improving throughput of a TDMA spread spectrum communication system.

Yet another problem experienced by TDMA spread spectrum communication systems is related to the complexity of the spreading equipment. Conventional systems providing duplex communications require using two generators of virtually infinite NN PN spreading sequences for each station (one for the transmitter part of a communication station and another one for its receiver part). As mentioned earlier herein, such generators are usually very expensive. The generators' costs may significantly influence the overall cost of communication system.

There is a need for a spread spectrum communication system, including a spread spectrum TDMA system, that can effect synchronization for duplex communications using only one spread sequence generator per communication station.

There is a need for a spread spectrum communication system, including a spread spectrum TDMA system, that can quickly establish synchronization for carrying out communication operations in each time slot in order to enhance throughput of the system.

There is a need for a spread spectrum communication system, including a spread spectrum TDMA system that can adaptively alter various operational parameters to accommodate various operational conditions.

SUMMARY OF THE INVENTION

A system for synchronizing a spreading sequence transmitted during a plurality of time slots includes a plurality of communication stations. Each communication station includes: (a) a control unit; (b) a spreading sequence generator for originating the spreading sequence; (c) at least one of a transmitter and a receiver; (d) at least one delay unit responding to the control unit for imparting a first delay to the spreading sequence presented to the transmitter unit and responding to the receiver unit for imparting a second delay to the spreading sequence presented to the receiver unit; and (e) a synchronizing sequence generator coupled with the transmitter unit. The synchronizing sequence generator in a first station presents a synchronizing sequence for transmission accompanying spread information transmitted during selected time slots. A receiver unit in a second station employs the synchronizing sequence, in cooperation with the spreading sequence for despreading received spread information.

An apparatus for use in a communication system employing a pseudonoise spreading sequence for spreading transmitted information during a plurality of time slots is deployed in a plurality of substantially similar units within the communication system. Each respective unit of the plurality of units includes: (a) A control unit. (b) A spreading sequence originating unit coupled with the control unit for originating the spreading sequence. (c) At least one of a transmitter unit and a receiver unit. The transmitter unit and the receiver unit are coupled with the spreading sequence originating unit and coupled with the control unit. (d) At least one delay unit coupled with the transmitter unit and coupled with the spreading sequence originating unit. The at least one delay unit responds to the control unit for imparting a first delay to the spreading sequence presented to the transmitter unit. The at least one delay unit responds to the receiver unit for imparting a second delay to the spreading sequence presented to the receiver unit. (e) A synchronizing sequence originating unit coupled with the transmitter unit. The synchronizing sequence originating unit in a first unit of the plurality of units has a first transmitter unit presenting a synchronizing sequence for transmission by the first transmitter unit accompanying spread information transmitted during selected time slots of the plurality of time slots. A second receiver unit in a second unit of the plurality of units employs the synchronizing sequence (preferably using a matched filter, which is matched to the synchronizing sequence), in cooperation with the spreading sequence for despreading received spread information.

A method for effecting signal synchronization for employing a pseudonoise spreading sequence for spreading transmitted information during a plurality of time slots includes the steps of: (a) Providing a plurality of communication stations. (b) For each respective communication station of the plurality of communication stations, in no particular order: (1) Providing a control unit. (2) Providing a spreading sequence originating unit coupled with the control unit for originating the spreading sequence. (3) Providing at least one of a transmitter unit and a receiver unit. The transmitter unit and the receiver unit are coupled with the spreading sequence originating unit and coupled with the control unit. (4) Providing at least one delay unit coupled with the transmitter unit and coupled with the spreading sequence originating unit. (5) Providing a synchronizing sequence originating unit coupled with the transmitter unit. (c) In no particular order: (1) Operating the at least one delay unit to respond to the control unit to impart a first delay to the spreading sequence presented to the transmitter unit. (2) Operating the at least one delay unit to respond to the receiver unit to impart a second delay to the spreading sequence presented to the receiver unit. (d) In no particular order:

(1) Operating the synchronizing sequence originating unit in a first communication station of the plurality of communication stations having a first transmitter unit to present a synchronizing sequence for transmission by the first transmitter unit accompanying spread information transmitted during selected time slots of the plurality of time slots.

(2) Operating the second receiver unit in a second communication station of the plurality of communication stations to employ the synchronizing sequence (preferably using a matched filter, which is matched to the synchronizing sequence), in cooperation with the spreading sequence for despreading received the spread information.

It is, therefore, an object of the present invention to provide a spread spectrum communication system, including a spread spectrum TDMA system, that can effect synchronization for duplex communications using only one spread sequence generator unit per communication station.

It is another object of the present invention to provide a spread spectrum communication system, including a spread spectrum TDMA system, that can quickly establish synchronization for carrying out communication operations in each time slot in order to enhance throughput of the system.

It is yet another object of the present invention to provide a spread spectrum communication system, including a spread spectrum TDMA system, that can adaptively alter various operational parameters to accommodate various operational conditions.

Further objects and features of the present invention will be apparent from the following specification and claims when considered in connection with the accompanying drawings, in which like elements are labeled using like reference numerals in the various figures, illustrating the preferred embodiments of the invention.

DETAILED DESCRIPTION OF THE PREFERRED EMBODIMENT

The term "locus" is intended herein to indicate a place, location, locality, locale, point, position, site, spot, volume, juncture, junction or other identifiable location-related zone in one or more dimensions. A locus in a physical apparatus may include, by way of example and not by way of limitation, a comer, intersection, curve, line, area, plane, volume or a portion of any of those features. A locus in an electrical apparatus may include, by way of example and not by way of limitation, a terminal, wire, circuit, circuit trace, circuit board, wiring board, pin, connector, component, collection of components, sub-component or other identifiable location-related area in one or more dimensions. A locus in a flow chart may include, by way of example and not by way of limitation, a juncture, step, site, function, query, response or other aspect, step, increment or an interstice between junctures, steps, sites, functions, queries, responses or other aspects of the flow or method represented by the chart.

Figure 1:
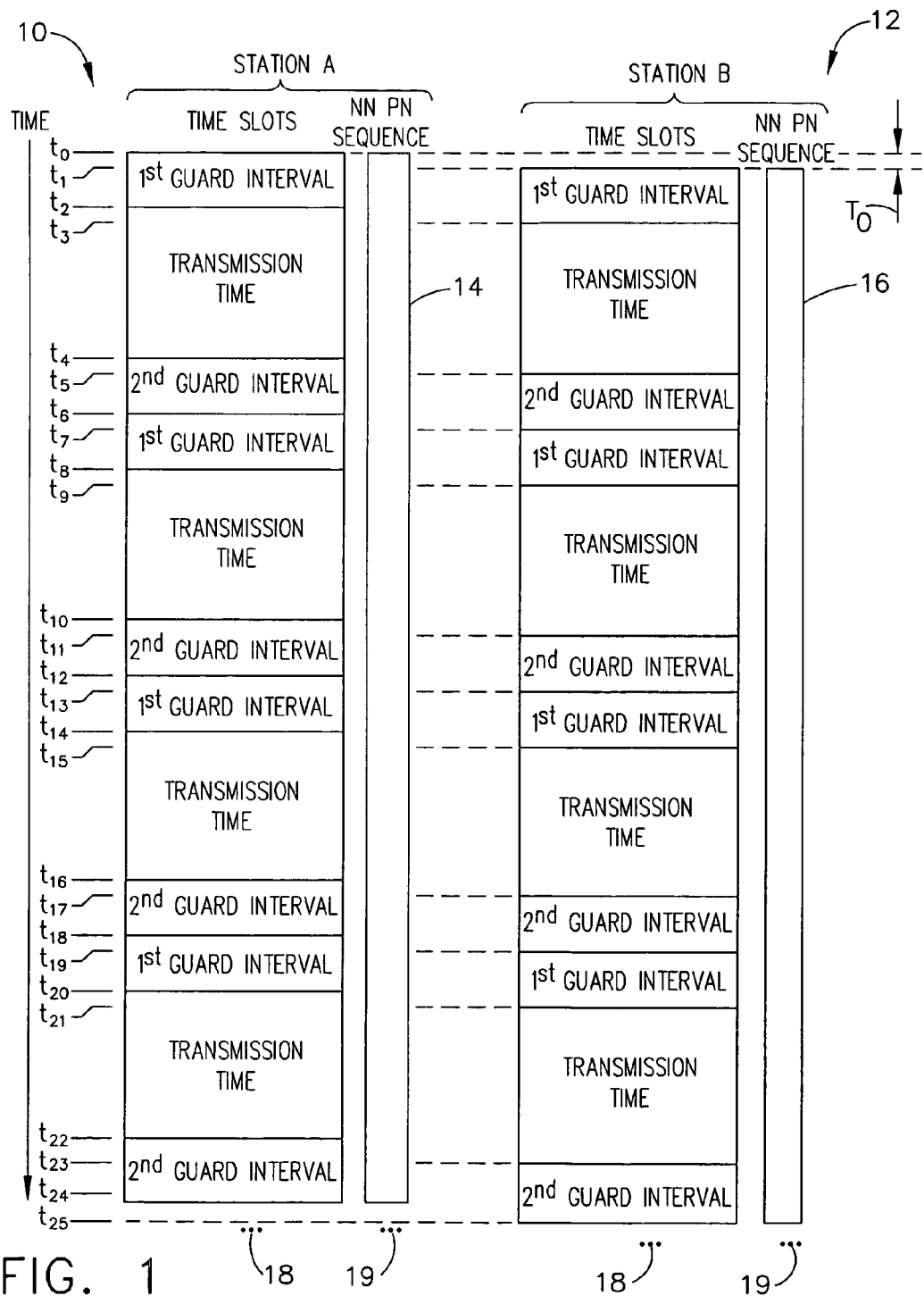
FIG. 1 is a timing diagram comparing time slots of two communication stations operating in a transmit mode.

FIG. 1 is a timing diagram comparing time slots of two communication stations operating in a transmit mode. In FIG. 1, a first timing diagram 10 relates to transmission operation by a station A, and a second timing diagram 12 relates to transmission operation by a station B.

Timing diagram 10 illustrates a series of four time slots, during which station A can transmit and receive information. In timing diagram 10, only a transmit mode of station A is shown. A first time slot occupies a time interval $t_0$-$t_6$. A second time slot occupies a time interval $t_6$-$t_{12}$. A third time slot occupies a time interval $t_{12}$-$t_{18}$. A fourth time slot occupies a time interval $t_{18}$-$t_{24}$. During the entire interval $t_0$-$t_{24}$, an NN PN spreading sequence 14 is generated. A generator (not shown in FIG. 1) of NN PN sequence 14 is restarted by a new initialization vector at the beginning of each time slot.

Timing diagram 12 illustrates a series of four time slots, during which station B can transmit and receive information. In timing diagram 12, only a transmit mode of station B is shown. Station B is delayed in time by a delay interval $T_0$. This delay interval $T_0$ is a result of time uncertainty between a clock controlling operation of station A and a clock controlling operation of station B (clocks are not shown in FIG. 1). Delay interval $T_0$ has a duration spanning an interval $t_0$-$t_1$ and a result is that a time slot array associated with station B that is substantially identical to the time slot array associated with station A is offset or delayed by a time substantially equal with delay interval $T_0$ (i.e., interval $t_0$-$t_1$). Thus, with regard to station B, a first time slot occupies a time interval $t_1$-$t_7$. A second time slot occupies a time interval $t_7$-$t_{13}$. A third time slot occupies a time interval $t_{13}$-$t_{19}$. A fourth time slot occupies a time interval $t_{19}$-$t_{25}$. An NN PN spreading sequence 16 is transmitted during the entire interval $t_1$-$t_{25}$. Time slots and generation of NN PN spreading sequences 14, 16 for station A and station B may continue, as indicated by ellipses 18, 19.

Each respective time slot for station A and station B is substantially the same. In order to avoid prolixity, only one representative time slot will be described in detail. The time slot associated with station A that occupies time interval $t_0$-$t_6$ includes a first guard interval occupying a time interval $t_0$-$t_2$, includes a transmission interval occupying a time interval $t_2$-$t_4$ and includes a second guard interval occupying a time interval $t_4$-$t_6$. A succeeding time slot begins at time $t_6$.

Because of the time uncertainty (i.e., delay interval $T_0$) between station A and station B, first guard interval (interval $t_0$-$t_2$) is established during which no transmission is permitted. In principle, each station can contain one or more transmitters and one or more receivers. All transmitters and receivers of the same station use the same clock. Timing diagrams in FIG. 1 illustrate operation of only transmitters of two communication stations A and B. It is clear, however, that the delay interval $T_0$ between the transmitters of station A and B shown in FIG. 1, which is caused by the time uncertainty, is identical to the delay interval between the transmitter of station A and a receiver of station B. If, for example, station A transmits information to station B, the first guard interval prevents station A transmitting immediately at the beginning of the time slot (i.e., at time $t_0$). To avoid loss of information, to accommodate the existence of delay interval $T_0$ because of time uncertainty, station A should begin transmitting no earlier than the end of the first guard interval (i.e., no earlier than time $t_2$). The first guard interval should be established having an interval $t_0$-$t_2$ that exceeds the maximum possible time uncertainty among clocks of all stations in a communication system.

Second guard interval (interval $t_4$-$t_6$), during which no transmission is permitted, is established at the end of a time slot for two reasons: signal propagation time between transmitting and receiving stations and time uncertainty between the clocks of transmitter and receiver stations. Since a certain time is required for a signal transmitted by station A to reach station B, the signal transmitted by station A at the time close to the end of a current time slot can reach station B after the beginning of the next succeeding time slot. In addition, the time uncertainty can create delay of one station relative to the other. In the example shown in FIG. 1, the clock of station B is delayed relative to the clock of station A. However, the situation can be opposite with the same probability. That is the clock of station A can be delayed relative to the clock of station B. In this opposite situation, a signal transmitted by station A at a time close to the end of a current time slot according to the station A clock can be transmitted at a time close to the beginning of the next succeeding time slot according to the clock of station B. It is for this reason that the second guard interval, which is intended to prevent these timing anomalies, contains two components: a first component takes into account propagation time and a second component takes into account time uncertainty. No transmission is permitted during the second guard interval (interval $t_4$-$t_6$). Requiring an early cessation of transmission before the end of a particular time slot makes it possible to ensure receive all information transmitted during the particular time slot.

Duration of time slots is generally established for a communication system and is generally substantially the same duration for all stations in the communication system. Reducing the first and the second guard intervals allows allocating more time for data transmission and, consequently, achieving higher throughput by the communication system.

A receiver station (not shown in FIG. 1) preferably should begin reception substantially immediately at the beginning of each time slot (according to its own clock) when distance between the transmitter and receiver stations is unknown. A receiver station should preferably begin reception delayed from the beginning of a respective time slot (according to its own clock) by an interval substantially equal to propagation time between the transmitter and receiver when distance between the transmitter and receiver is known.

Figure 2:
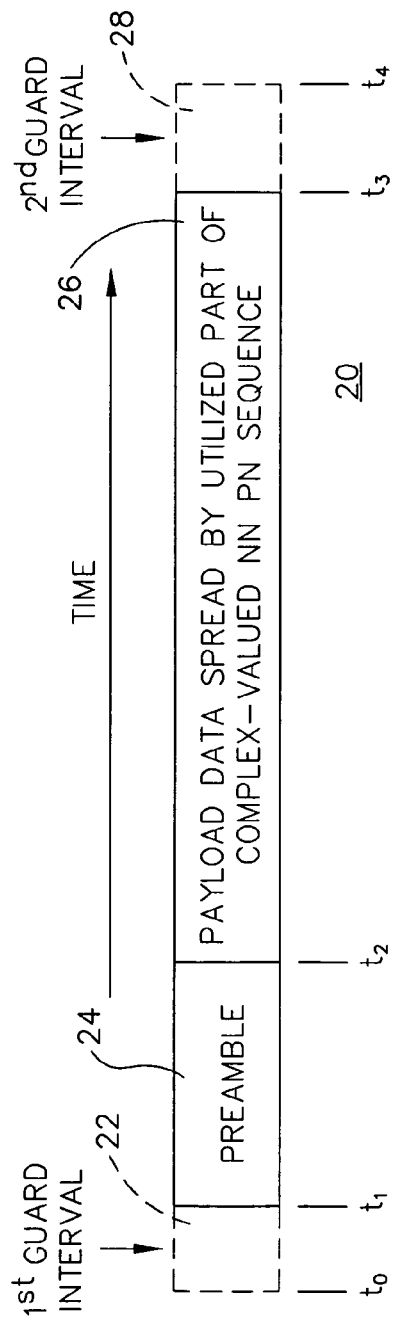
FIG. 2 is a schematic diagram of a time slot for a transmit operation.

FIG. 2 is a schematic diagram of a time slot for a transmit operation. In FIG. 2, a time slot 20 spans a time interval $t_0$-$t_4$. A first guard interval 22 spans an interval $t_0$-$t_1$. A preamble 24 spans an interval $t_1$-$t_2$. A payload data transmission interval 26 spans an interval $t_2$-$t_3$, during which information (payload data) having been spread by the spreading sequence is transmitted. A second guard interval 28 spans an interval $t_3$-$t_4$. During guard intervals 22 and 28 no transmission takes place, as indicated by a dashed line in FIG. 2.

As described earlier herein, first guard interval 22 is established to accommodate time uncertainty among stations in the communication system or network. Time uncertainty among stations in a communication system or network exists despite the fact that the reference clocks of all the stations in the network are periodically (for example, with period of one second) synchronized, such as by way of example and not by way of limitation, using GPS (Global Positioning System) satellite signals. Although the time uncertainty among stations may have many causes, the largest component of time uncertainty is often caused by frequency drifts of the various stations' reference oscillators. Absence of the first guard interval 22 could lead to a transmitter starting transmission much earlier than an intended receiver starts reception so that acquisition of a transmitted signal by the receiver may be impossible and all information transmitted during a time slot may be lost. T₀ avoid such a situation, prior art TDMA communication systems require a first guard interval 22 that is preferably selected to have a duration greater than a maximum possible time uncertainty among stations in a communication system or network.

The present invention provides a variable first guard interval 22. In a time slot that follows directly after synchronization of the stations' reference clocks by the GPS signals, duration of the first guard interval may be set close to zero because possible time differences among stations' clocks are negligible at that time. First guard interval is thereafter increased to account for time differences among the stations' clocks accumulated slot-by-slot. A simple and preferred approach provides for increasing first guard interval 22 in a substantially linear fashion to compensate gradually growing time uncertainty caused by differences in frequency drifts of the stations' reference oscillators. The duration of first guard interval 22 achieves its largest value in the time slot that precedes the next synchronization of the stations' reference clocks by the GPS signals because possible time shifts among stations' clocks achieve a maximum value in the last time slot before clock synchronization. In the present invention first guard interval 22 has a duration generally equal to duration of guard intervals employed in prior art systems only in the last time slot within each GPS synchronization cycle. First guard intervals 22 employed in the present invention are shorter than prior art systems' guard intervals in time slots other than in the last time slot within each GPS synchronization cycle. The average duration of first guard intervals 22 in the present invention is generally one-half the duration of first guard intervals employed in prior art systems.

Substantially immediately after the end of the first guard interval 22 (i.e. substantially at time $t_1$), a preamble is generated, selected or otherwise obtained and transmitted during preamble interval 24. The preamble is preferably an adjustable relatively short (compared to the duration of time slot 20) complex-valued nonlinear PN synchronizing sequence (hereinafter terms "preamble" and "synchronizing sequence" are used interchangeably) used for acquisition and synchronization of complex-valued virtually infinite NN PN spreading sequences that are employed for payload data spreading and despreading (hereinafter referred to as a "spreading sequence"). The preamble is preferably configured as concatenated sequence consisting of inner and outer sequences. The outer sequence of the concatenated sequence modulates its inner sequence. Both of the inner and outer sequences of preamble 24 are pseudorandomly selected or generated so that a new preamble is used for synchronization in each time slot 20. It is preferred that the inner sequences of the preamble have the same chip length and modulation technique used by the spreading sequence. Such similarity of characteristics and structure between the synchronizing sequence and the spreading sequence make the preamble and subsequent spread spectrum payload data transmitted during transmission period 26 substantially indistinguishable for an unauthorized receiver.

The lengths of both inner and outer sequences of the preamble are preferably variable and preferably can be adjusted to accommodate various communication conditions. The length of the inner sequence is preferably selected slightly longer than an expected delay spread of the communication channel impulse response. Therefore, the inner sequence is longest when the delay spread is very large or when the delay spread is unknown. The overall length of the preamble (i.e., the number of symbols in the preamble) should be sufficient for effecting reliable synchronization with the extant spreading sequence. T₀ assure proper synchronization the longest preamble is selected in the harshest communication environment (e.g., long distance between transmitter and receiver, high absorption of the signal energy in the physical channel, presence of intentional and unintentional jammers or other adverse conditions) or when conditions of communications are unknown. Since the inner sequence is an element of the outer sequence, the number of elements of the outer sequence is equal to the ratio of the overall preamble length to the inner sequence length. Because of the relationships among the inner and outer sequences and the final length of the preamble, adapting the length of the preamble to the severity of communication conditions may be performed by changing the length of the outer sequence of the preamble. For a given level of reliability of synchronization, the shorter the length of the preamble, the higher the throughput of the communication system that can be achieved. Because knowledge of communication conditions enables the reduction of the length of the preamble, it is preferred that each station in a communication system or network measure, accumulate, update, and disseminate information about extant communication conditions among the other stations belonging to the system or network.

The use of a relatively short preamble (synchronizing sequence) for alignment of received and reference spreading sequences that spread and despread payload data; employment of an adjustable preamble with adaptation of the lengths of the preamble inner and outer variable nonlinear PN sequences to the communication conditions; providing the same chip rate and modulation technique for the synchronizing sequence and the inner sequence of the preamble; and independent pseudorandom variation of both inner and outer nonlinear PN sequences of the preamble so that each time slot is synchronized by a new preamble are some of distinctive features of the present invention. These distinctive features provide radical increase in the system throughput without any reduction in the reliability of synchronization and without any increase in probability of interception.

Transmission of payload data spread by the spreading sequences starts substantially immediately after the end of the preamble interval 24 (i.e., at time $t_2$). Transmission of the spread spectrum payload data is stopped at the beginning of the second guard interval (i.e., at time $t_3$).

As discussed earlier herein, second guard interval 28 is provided to avoid loss of transmitted information because of signal propagation time and time uncertainty among clocks of stations in the network. Second guard interval 28 is usually longer than first guard interval 22. Any measures that may reduce the length of second guard interval 28 will increase the throughput of a TDMA communication system. In prior art TDMA communication systems, second guard interval 28 is selected to exceed the sum of the maximum possible propagation time and maximum possible time uncertainty in the communication system or network. The present invention provides reduction of both components of second guard interval 28: the component related to the time uncertainty and the component related to the propagation time. The invention uses variations of the time uncertainty during each period of stations' clocks synchronization (for example, by GPS signals) for reducing the component of second guard interval 28 related to the time uncertainty. It is done substantially the same way as reduction of first guard interval 22. Knowledge of the distance between transmitting and receiving stations is used for reducing the component related to the signal propagation time except in the situation when the distance between transmitting and receiving stations is at a maximum.

Figure 3:
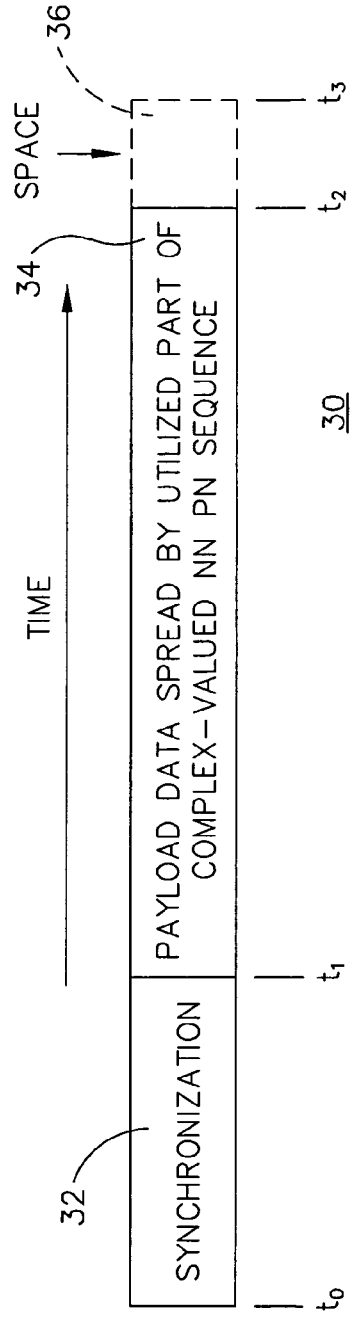
FIG. 3 is a schematic diagram of a time slot for a receive operation.

FIG. 3 is a schematic diagram of a time slot for a receive operation. In FIG. 3, a time slot 30 spans a time interval $t_0$-$t_3$. A synchronization interval 32 spans an interval $t_0$-$t_1$. A reception interval 34 spans an interval $t_1$-$t_2$, during which information or payload data having been spread by the spreading sequence in the transmitter (not shown in FIG. 3) is received and despread. Reception is stopped when all payload data is received. In most cases this leaves a space 36 between the end of the payload data reception operation and the beginning of the next time slot (not shown in FIG. 3). Space 36 is indicated as spanning an interval $t_2$-$t_3$ in FIG. 3.

The present invention preferably provides complex-valued matched filters with variable coefficients and adjustable length for processing inner and outer sequences of the preamble (the synchronizing sequence). The use of matched filters for processing of synchronizing sequences is known. The present invention differs from the prior art by configuring lengths of the matched filters to be adjustable for each time slot and to be equal to the lengths of the transmitted inner and outer sequences of the synchronizing sequence for each time slot. This adjustability is preferably achieved by selecting lengths of the matched filters for the inner and outer sequences in a receiving station and selecting the lengths of the inner and outer sequences in a corresponding transmitting station by a substantially identical program based on substantially the same information regarding communication conditions. Filter length selections are preferably made during a preceding time slot for use during an extant time slot. It is most preferred to select the lengths of the matched filters for an extant time slot during a previous time slot (preferably the next-preceding time slot). The present invention also differs from the prior art by pseudorandomly selecting or generating the coefficients of the matched filters for the inner and outer sequences (synchronizing sequence) so that the filters always match the transmitted pseudorandomly selected or generated inner and outer sequences (synchronizing sequence). To this end, the coefficients of the matched filters are preferably pseudorandomly selected or generated in all receiving stations by substantially the same program that is used for pseudorandom selection or generation of the inner and outer sequences (synchronizing sequence) in transmitting stations. Coefficients of the variable matched filters for a current or extant time slot are preferably selected or generated during a preceding time slot. It is most preferred that coefficient selection or generation for the use during a current time slot is performed during the closest time slot preceding the current time slot. Such selection or generation of filter coefficients before the beginning of a current time slot assures that both transmitting and receiving stations in a communication system or network are ready to provide synchronization using a newly pseudorandomly selected or generated preamble adjusted to the communication conditions by the beginning the extant time slot.

When a communication station configured according to the present invention is in a receive mode, the station begins reception immediately at the beginning of time slot 30 (based on the respective station's own clock) if the signal propagation time between the transmitter and receiver is unknown. If the signal propagation time is known, the station starts reception at the moment when the signal is expected to reach the receiver's antenna. FIG. 3 illustrates, by way of example and not by way of limitation, a situation when the signal propagation time between the transmitter and receiver is unknown. During synchronization interval 32 the preamble (FIG. 2) has to be acquired and a position of the preamble end and the beginning of the spread spectrum payload data has to be determined. During synchronization interval 32, the delay spread of the communication channel impulse response also can be determined (when unknown) or defined more precisely (when known) using the output signal of the filter matched with the inner nonlinear PN sequence of the preamble.

When the signal propagation time is unknown (FIG. 3), a receiver likely begins reception and synchronization operations earlier than the time, at which the signal reaches the receiver's antenna. This early start increases the probability of false synchronization compared to a situation when knowledge of the propagation time is used for timing the start of reception and synchronization operations close to the instant when the signal reaches the receiver's antenna. Therefore, all means for disseminating information about positions, directions of movement, and speed of the stations constituting a communication system or network are preferably used in the present invention. These means may include, but are not limited by, incorporating the information about stations of the communication system or network in the transmitted payload data.

Acquisition of the preamble (i.e., synchronizing) and determining a position of its end allow a receiver to start reception of the spread spectrum payload data directly after synchronization interval 32 because the end of the preamble (FIG. 2) occurs substantially simultaneously with the beginning of the spread spectrum payload data reception interval 34. While carrying out synchronization and reception of the spread spectrum payload data, a receiver performs measurements regarding existing communication conditions. Information regarding existing communication conditions may be disseminated among various communication stations in a communication system or network and used for various purposes including, by way of example and not by way of limitation, adjustment of the lengths of the inner and outer sequences of the preamble (synchronizing sequence) and configuring corresponding filters as matched filters for treating the synchronizing sequence.

During the interval $t_2$-$t_3$ (space 36) no reception is performed, as indicated by a dashed line in FIG. 3. The length of space 36 is substantially equal to an algebraic sum of the time uncertainties between communicating transmitter and receiver stations and the difference between expected propagation time and real propagation time. In the situation when the signal propagation time between transmitter and receiver is unknown (FIG. 3), the expected propagation time is presumed to be a maximum propagation time. Space 36 can have a duration equal to zero such as, by way of example and not by way of limitation, when the signal propagation time is known accurately and time uncertainty between the transmitter station and receiver stations is substantially zero.

Figure 4:
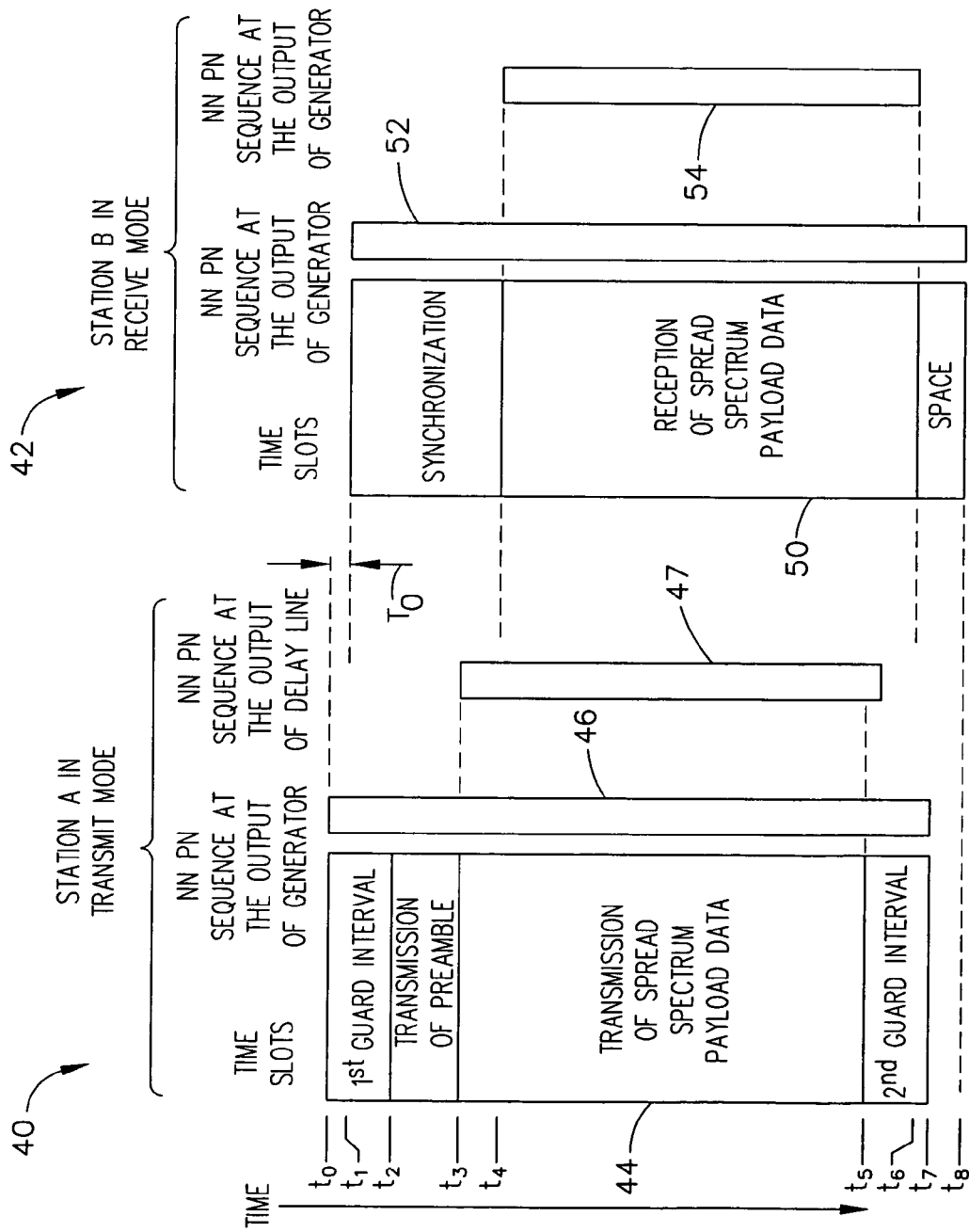
FIG. 4 is a timing diagram comparing time slots of a first communication station operating in a transmit mode and a second communication station operating in a receive mode.

FIG. 4 is a timing diagram comparing time intervals of a first communication station operating in a transmit mode and a second communication station operating in a receive mode. In FIG. 4, a first timing diagram 40 relates to transmission operation by a station A, and a second timing diagram 42 relates to reception operation by a station B.

Timing diagrams 40, 42 representatively illustrate relative positions of various procedures in communicating transmitting and receiving stations for a situation when distance between the transmitting and receiving stations is unknown and the transmitting station has a slightly faster reference clock than the receiving station.

Timing diagram 40 illustrates a representative transmit time slot 44 during which station A transmits information. A first guard interval occupies a time interval $t_0$-$t_2$. A period, during which a preamble (synchronizing sequence) is transmitted, occupies a time interval $t_2$-$t_3$. A period during which information ("payload data") spread by the spreading sequence used in the communication system that includes Stations A and B is transmitted occupies a time interval $t_3$-$t_5$. A second guard interval occupies a time interval $t_5$-$t_7$. A generated NN PN spreading sequence 46 is generated by a sequence generator (not shown in FIG. 4; see FIGS. 5 and 6) at station A during the entire interval $t_0$-$t_7$. A utilized or transmitted NN PN spreading sequence 47 enters a spreading unit of the station A transmitter from an output locus of a delay line (not shown in FIG. 4; see FIGS. 5 and 6) and is used by station A for spreading payload data during the interval $t_3$-$t_5$.

Timing diagram 42 illustrates a representative receive time slot 50, during which station B receives information. Receive time slot 50 begins at a time $t_1$. Time $t_1$ lags time $t_0$ (the start time of transmit time slot 44) by a delay interval $T_0$. Delay interval $T_0$ is a result of time uncertainty between a clock controlling operation of station A and a clock controlling operation of station B (clocks are not shown in FIG. 4). Delay interval $T_0$ has a duration spanning an interval $t_0$-$t_1$. A synchronization interval occupies a time interval $t_1$-$t_4$. During this synchronization interval $t_1$-$t_4$, the preamble containing the synchronizing sequence transmitted by station A during the interval $t_2$-$t_3$ is employed by Station B to establish synchrony with signals received from Station A. A period during which spread information ("payload data") may be received and despread by the spreading sequence used in the communication system that includes Station A and Station B occupies a time interval $t_4$-$t_6$. Reception by Station B is stopped when all payload data is received from Station A. In most cases this leaves a space between the end of the payload data reception at instant $t_6$ and the end of current time slot $t_8$ in FIG. 4. A generated NN PN spreading sequence 52 is generated by a sequence generator (not shown in FIG. 4; see FIGS. 5 and 6) at station B during the entire interval $t_1$-$t_8$. A utilized part 54 of generated NN PN spreading sequence 52 is sent to a despreading unit of the station B receiver from an output locus of a delay line (not shown in FIG. 4; see FIGS. 5 and 6) during the interval $t_4$-$t_6$.

At the beginning of each time slot 40, 42, each respective generator of a virtually infinite complex-valued NN PN spreading sequence is restarted by a new initialization vector in each respective communication Station A, B according to its respective clock. Each respective spreading sequence generator generates a fragment of the spreading sequence having a respective length or duration substantially equal with the respective time slot length. The spreading sequence fragment presented by the spreading sequence generator of Station A therefore has a duration substantially during the time interval $t_0$-$t_7$. The spreading sequence fragment presented by the spreading sequence generator of Station B therefore has a duration substantially during the timer interval $t_1$-$t_8$. The initialization vector is preferably substantially the same for all stations in a communication system or network and is preferably formed during a previous time slot using a respective initialization vector generator cooperating with a respective spreading sequence generator in each respective station. Preferably the respective initialization vector generators are substantially identical for all stations. The respective initialization vectors are preferably formed in each respective station based on information that is mutual for all stations. This mutual information may include, by way of example and not by way of limitation, time of day, number of a current frame and number of a current slot within the frame. The spreading sequence generator generates a spreading sequence for spreading and despreading data transmitted and received during a current time slot. The initialization vector generator forms an initialization vector during one time slot for use during a later time slot. It is preferred that an initialization vector generator forms an initialization vector during one time slot for use during a next subsequent time slot.

The fragment of the spreading sequence generated during a time slot is sent to both receiver and transmitter parts of a station over a digital delay line with two controlled outputs. One controlled output is provided to the station transmitter unit; the other controlled output is provided to the station receiver unit. A random access memory (RAM) maybe used as a digital delay line for imparting desired delays to the spreading sequence.

Immediately after the end of preamble (time $t_3$; FIG. 4), the appropriately delayed fragment of the spreading sequence from the first output of the RAM (i.e., the spreading sequence fragment to which the first delay has been imparted) is sent to the spreading unit of the transmitter of the station (Station A; FIG. 4). Only a portion of the first-delayed spreading sequence fragment can be utilized for spreading the payload data for transmission (during interval $t_3$-$t_4$; FIG. 4). Transmission of the payload data by Station A can start only after the first guard interval and transmission of preamble (interval $t_0$-$t_3$; FIG. 4), and transmission of the payload data by Station A can be carried out only until the beginning of the second guard interval (time $t_5$; FIG. 4). As a result, the time during which payload data spreading and transmission may occur (interval $t_3$-$t_5$; FIG. 4) is always shorter than the transmission time slot length (interval $t_0$-$t_7$; FIG. 4).

Directly after completion of synchronization (time $t_4$; FIG. 4) in the receiver part of the station (Station B; FIG. 4), the properly delayed fragment of the spreading sequence from the second output of the RAM (i.e., the spreading sequence fragment to which the second delay has been imparted) is sent to the despreading unit of the receiver part of Station B. Only a portion of the second-delayed fragment can be utilized for despreading received information (during interval $t_4$-$t_6$; FIG. 4). Despreading can occur only during the time between the end of synchronization and the end of the data reception (during interval $t_4$-$t_6$; FIG. 4). This time interval is shorter than the reception time slot length (interval $t_1$-$t_8$; FIG. 4).

In most TDMA networks with spread spectrum signals, each station in a communication system or network can operate in a duplex mode. In a duplex mode a station may substantially simultaneously transmit and receive information. Such simultaneous operation may involve using different directional antennas for transmission and reception at the same frequency, or may involve using the same antenna for transmission and reception at different frequencies. Because transmission and reception performed by one station are usually shifted relative to each other in time, in prior art TDMA spread spectrum systems every station has two independent generators of the virtually infinite complex-valued NN PN spreading sequence. One of the two sequence generators is used for data spreading in the transmitter part of the station, and the other of the two sequence generators is used for despreading data in the receiver part of the station. Because the sequence generators are very expensive, employing two sequence generators in each station significantly increases the overall cost of a communication system or network.

In the present invention only one sequence generator of a spreading sequence is used for both transmitter and receiver parts of a station.

Figure 5:
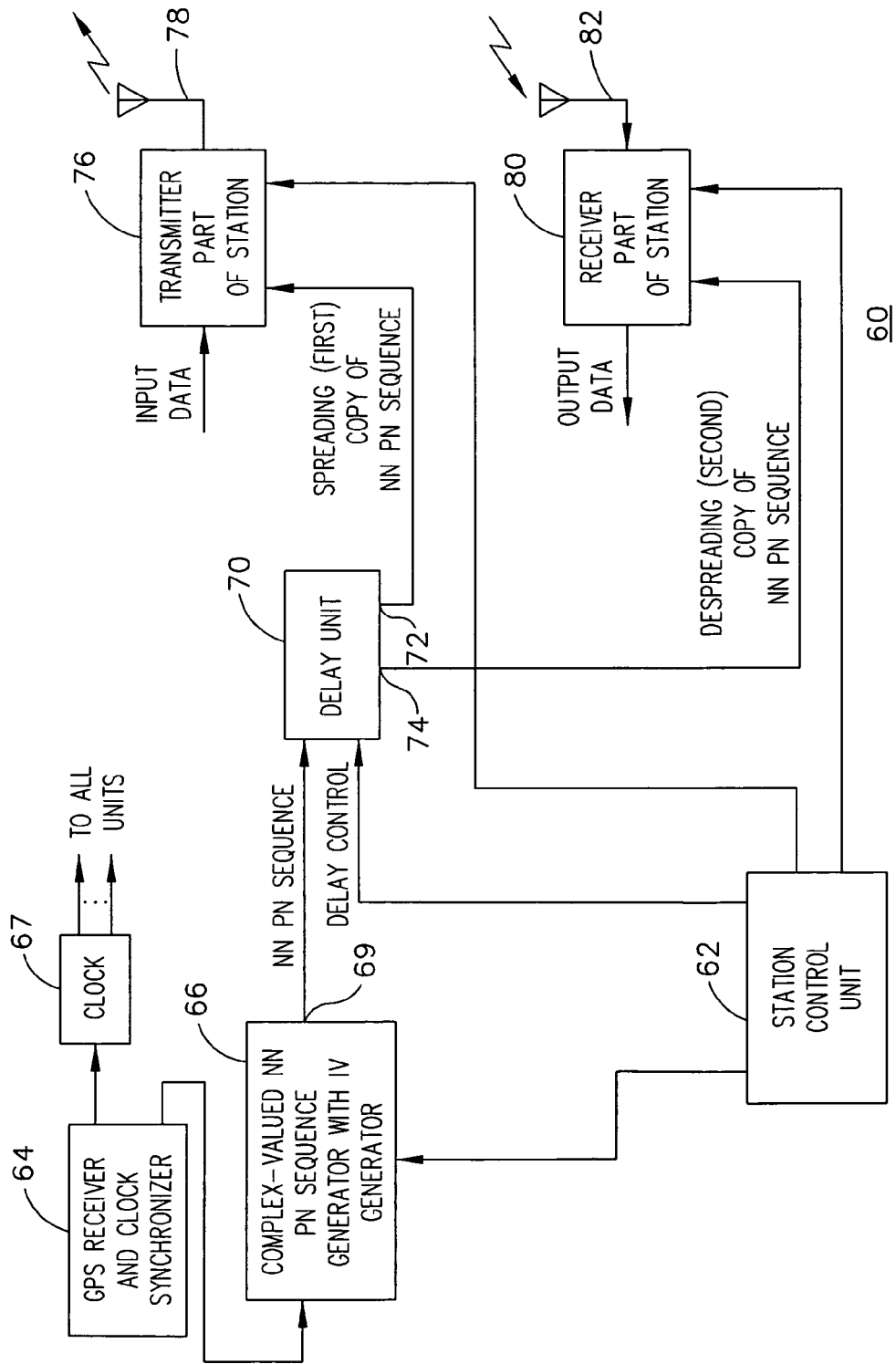
FIG. 5 is a simplified block diagram of the synchronizing apparatus in a communication station using the present invention.

FIG. 5 is a simplified block diagram of the synchronizing apparatus in a communication station using the present invention. In FIG. 5, a communication station 60 includes a control unit 62 coupled with all units of the communication station. A GPS (Global Positioning System) receiver and clock synchronizer 64 is connected to a complex-valued NN PN sequence generator 66 and a clock unit 67. Complex-valued NN PN sequence generator 66 includes an initialization vector (IV) generator, which initializes the complex-valued NN PN sequence generator at beginning of each time slot. Thus, generator 66 starts generation of a fragment of the virtually infinite complex-valued NN PN sequence at the beginning of each time slot. Each fragment of the virtually infinite complex-valued NN PN sequence has length equal to the length of a time slot. Clock unit 67 is coupled with substantially all units of communication station 60. GPS receiver and clock synchronizer 64 periodically synchronizes clock unit 67 with signals received from GPS satellites. All stations in a communication system or network (not shown in FIG. 5) are simultaneously synchronized by GPS signals. GPS synchronization may occur, by way of example and not by way of limitation, on the order of once each second. GPS receiver and clock synchronizer 64 also provides information necessary for IV generation. Therefore, it is connected to complex-valued NN PN sequence generator 66.

During each time slot, a current fragment of the complex-valued NN PN sequence appears at an output locus 69 of generator 66. In a delay unit 70, which is coupled with output locus 69, the fragment of the complex-valued NN PN sequence undergoes two (first and second) variable and controllable delays. As a result of these delays, two copies of the complex-valued NN PN sequence are formed at outputs 72 and 74 of delay unit 70. The first copy of the complex-valued NN PN sequence from output 72 of delay unit 70 is used for spreading of signals corresponding to payload data transmitted by a transmitter part 76 of station 60 via an antenna 78. The second copy of the complex-valued NN PN sequence from output 74 of delay unit 70 is used for despreading of received signals corresponding to payload data received by a receiver part 80 of station 60 via antenna 82. The delay provided at output 72 of delay unit 70 is controlled by the station control unit 62, and the delay provided at the output 74 of delay unit 70 is controlled by a synchronization unit of the receiver part 80 of station 60. Depending on the communication situation, the delay at output 72 of delay unit 70 can be larger or smaller than the delay at the output 74 of this delay unit.

As shown in FIGS. 1, 2 and 4, transmitter part 76 of station 60 generates and transmits preamble, which is a synchronizing sequence, immediately after the end of the first guard interval. Transmission of the payload data follows the preamble transmission. To this end, forward error correction encoding of input data, modulation of the encoded data and spreading of the respective modulated signal are performed in transmitter part 76 of the station. Appropriate starting time of a fragment of the virtually infinite complex-valued NN PN sequence used for spreading is provided at output 72 of delay unit 70. The signals corresponding to the preamble and payload data are further processed in the transmitter. By way of example and not by way of limitation, they can be filtered, converted to analog domain, filtered again, translated to an appropriate for transmission frequency and amplified in a transmitter before entering antenna 78. The signals transmitted via antenna 78 are sent to an intended receiving station (not shown in FIG. 5).

Receiver part 80 of station 60 via antenna 82 receives signals sent by corresponding transmitter (not shown in FIG. 5). Initial processing of received signals may include, by way of example and not by way of limitation, the following procedures: amplification, analog filtering, conversion into digital domain and digital filtering. Further processing in receiver part 80 of station 60 includes synchronization using the preamble, despreading, demodulation, and decoding of payload data that are transmitted after the preamble. Appropriate starting time of a fragment of the virtually infinite complex-valued NN PN sequence used for despreading is provided at output 74 of delay unit 70.

If station 60 contains several independent transmitters and receivers, it still needs only one GPS receiver and clock synchronizer, only one clock unit, only one station control unit, only one generator of complex-valued NN PN sequence and only one delay unit. However, the number of outputs of delay unit 70 has to be increased to accommodate the total number of receivers and transmitters. Each output of delay unit 70 related to a transmitter should be controlled by station control unit 62, and each output of delay unit 70 related to a receiver should be controlled by the synchronization unit of a respective receiver.

Figure 6:
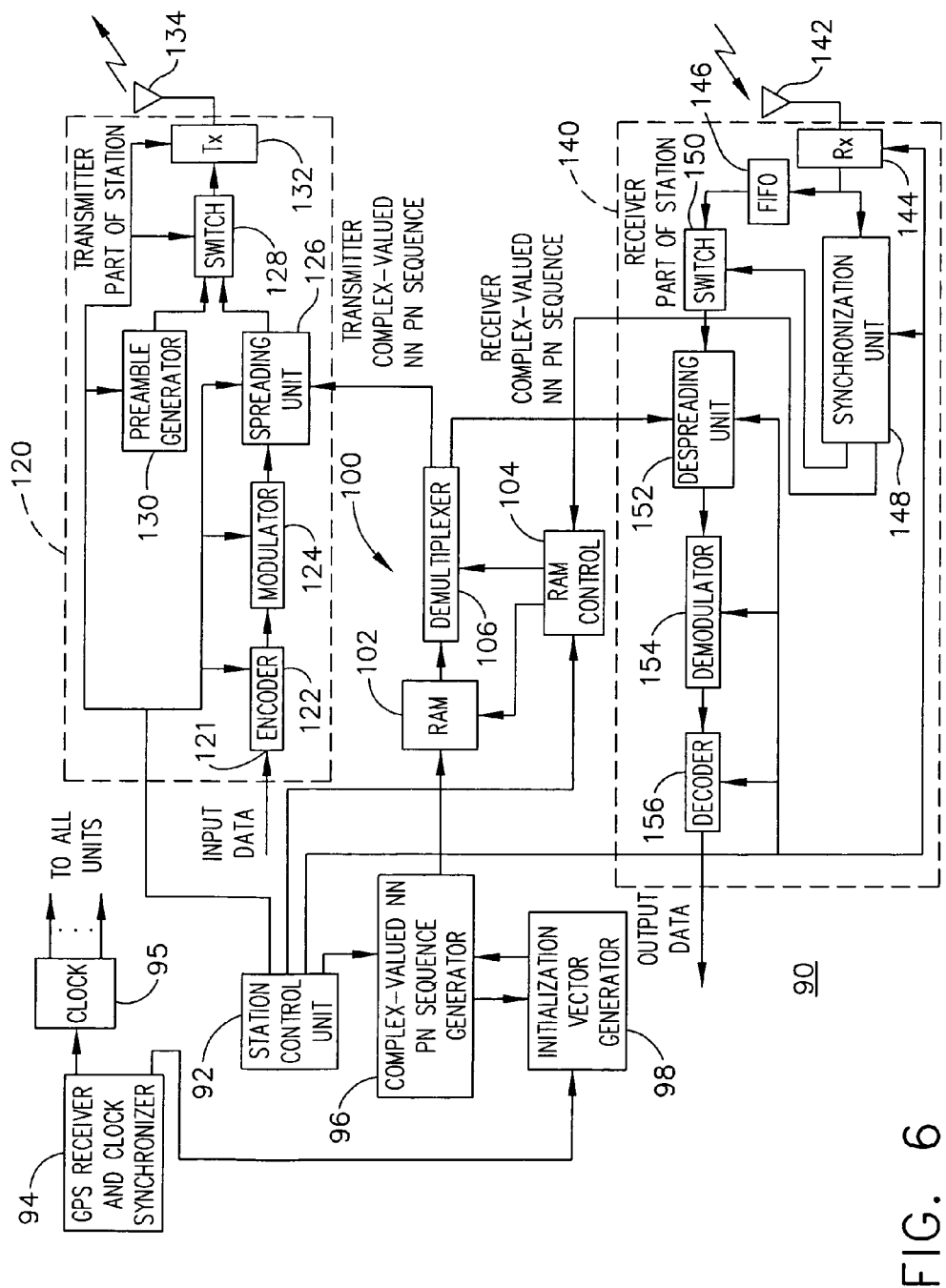
FIG. 6 is a block diagram of the synchronizing apparatus of the present invention showing more detail than is illustrated in FIG. 5.

FIG. 6 is a block diagram of the synchronizing apparatus of the present invention showing more detail than is illustrated in FIG. 5. FIG. 6, when considered in connection with timing diagrams described in connection with FIGS. 1-4, is intended to provide a substantially complete description of a preferred embodiment of the present invention. It should be understood that there may be other embodiments of the invention within the scope of protection of the claims. It should also be understood that the invention can be varied for satisfying specific requirements in design or technology by adding, changing or taking away specific details described below. In FIG. 6, a communication station 90 includes a station control unit 92 coupled with substantially all units of station 90 as necessary for carrying out operations. A GPS (Global Positioning System) receiver and clock synchronizer 94 is connected to a station clock unit 95. As will be understood by one skilled in the art of communication station design, station clock unit 95 may be coupled with substantially all units of communication station 90 as necessary for carrying out operations. Respective connections between station clock unit 95 and other units of communication station 90 are omitted from FIG. 6 in order to simplify FIG. 6. A spreading code generator 96 (i.e. generator of virtually infinite complex-valued NN PN sequence) is coupled with an initialization vector (IV) generator 98. GPS receiver and clock synchronizer 94 periodically synchronizes station clock unit 95 with signals received from GPS satellites. All other stations in a communication system or network (not shown in FIG. 6) also synchronize their clocks at the same time using GPS signals. GPS synchronization may occur, by way of example and not by way of limitation, on the order of once each second.

Spreading code generator 96 generates a complex-valued NN PN sequence, (hereinafter sometimes referred to as a "spreading sequence") which is used for spreading and despreading of signals corresponding to payload data, and sends it to a delay unit 100. Delay unit 100 includes a RAM (Random Access Memory) 102, a RAM control unit 104 and a demultiplexer 106. Station control unit 92 forms an instruction that determines how much a first delayed copy of a spreading sequence has to be delayed prior to entering a transmitter part 120 of station 90 (first delay). This instruction is sent to RAM control unit 104. RAM control unit 104 generates commands according to the received instruction and sends the commands to RAM 102 and demultiplexer 106. RAM 102 provides an appropriate delay of the first copy of the spreading sequence that is used for spreading of signals corresponding to payload data. Demultiplexer 106 sends this first copy of the spreading sequence to transmitter part 120 of station 90.

Transmitter part 120 includes an encoder 122 receiving input data intended for transmission at an input locus 121. Encoder 122 encodes input data received at input locus 121 and sends encoded payload data to a modulator 124. Modulator 124 modulates the encoded payload data received from encoder 122 and sends a modulated payload signal to a spreading unit 126. Spreading unit 126 applies the first delayed copy of the spreading sequence received from RAM 102 via demultiplexer 106 to the modulated payload signal and sends an encoded payload signal representing payload data to a switch 128. When encryption is necessary, an encrypting unit (not shown in FIG. 6) may be included in the signals processing chain such as, by way of example and not by way of limitation, at input 121 of encoder 122.

A preamble generator 130 generates, selects or otherwise obtains a synchronizing sequence for sending to switch 128. Switch 128 operates according to instructions received from control unit 92. As described earlier in connection with FIGS. 1, 2 and 4, switch 128 does not allow any signal to enter transmitter 132 during the first and second guard intervals. During the preamble interval, switch 128 connects the output of preamble generator 130 to the input of transmitter 132. At the beginning of the preamble interval, preamble generator 130 starts to send the preamble (synchronizing sequence), to transmitter 132 through switch 128. Transmitter 132 transmits the preamble via an antenna 134 to another station of the communication system or network (not shown in FIG. 6). After the end of the preamble, switch 128 disconnects the input of transmitter 132 from preamble generator 130 and connects transmitter 132 to spreading unit 126. Thereafter transmitter 132 transmits a spread spectrum signal representing the payload data until the beginning of the second guard interval. Immediately at the beginning of the second guard interval, switch 128 disconnects transmitter 132 from any input signal. All units of transmitter part 120 of the station are controlled by station control unit 92.

As described in connection with FIGS. 1, 2 and 4, the preamble formed by preamble generator 130 and transmitted immediately after the end of the $1^{st}$ guard interval is intended for synchronization. The preamble is preferably an adjustable relatively short (compared to the time slot length) complex-valued concatenated nonlinear PN synchronizing sequence formed by an inner sequence modulated by an outer sequence so that the inner sequence is an element (symbol) of an outer sequence. The inner and outer sequences are preferably pseudorandomly selected from a memory embedded in preamble generator 130 or pseudorandomly generated by preamble generator 130 so that each time slot is synchronized by a newly selected preamble. To make the preamble indistinguishable from the subsequent spread spectrum payload data for an interceptor, the inner nonlinear PN sequence of the preamble and the complex-valued virtually infinite NN PN spreading sequence used for the payload data spreading and despreading may have the same chip length and modulation technique.

In addition to pseudorandom selection or generation of the inner and outer sequences, preamble generator 130 may also regulate the lengths of the inner and outer sequences of the preamble according to the information about communication conditions provided by station control unit 92. Information relating to communication conditions may be shared among communication stations in a communication system or network. Based on this information, the length of the inner sequence may be selected slightly longer than an expected delay spread of the communication channel impulse response. When the delay spread is unknown, it preferably assumed to be a maximum value. The overall preamble length may be selected to provide sufficient reliability of synchronization. A longer preamble may be selected in the harshest communication environment.

Delay unit 100 also provides a second delay of the spreading sequence received from generator 96. While the first delay produces a first copy of the complex-valued NN PN sequence that is sent to transmitter part 120 of the station, the second delay produces a second copy of the spreading sequence that is sent to receiver part 140 of the station. As described above, the first copy of the spreading sequence is used for spreading a modulated signal corresponding to payload data in transmitter part 120 of the station. At the same time, the second copy of the complex-valued NN PN sequence that is sent to receiver part 140 of the station is used for despreading received signal corresponding to payload data.

Receiver part 140 of station 90 is coupled with an antenna 142 for receiving signals from another transmitting station (not shown in FIG. 6). Receiver part 140 includes a receiver 144 connected to antenna 142, connected to a FIFO (First In, First Out) memory 146 and connected to a synchronization unit 148. FIFO memory 146 is connected to a despreading unit 152 through a switch 150. Switch 150 operates under control of synchronization unit 148. Synchronization unit 148 also sends instructions to RAM control unit 104. Despreading unit 152 is coupled with a demodulator 154. Demodulator 154 is coupled with a decoder 156. The output of decoder 156 is the output of receiver part 140. All units of receiver part 140 are controlled by station control unit 92.

When reception starts, the baseband received digital signal is sent from receiver 144 to synchronization unit 148 and FIFO memory 146. Reception starts immediately at the beginning of a time slot if the signal propagation time between the transmitter and receiver 144 is unknown (FIGS. 3-4). Reception is delayed relative to the beginning of a time slot by a time equal to signal propagation time (according the clock of the receiving station, if the signal propagation time between the transmitter and receiver 144 is known.

At the beginning of reception, all units of receiver part 140 that are subsequent to FIFO memory 146 are disconnected from receiver 144 by switch 150. Thus, the received signal is initially processed only by the synchronization unit 148 during synchronization interval (FIGS. 3-4). If distance between transmitting station and intended receiving station is unknown, receiver 144 starts reception immediately after the beginning of the time slot. If distance between transmitting station and intended receiving station is known, receiver 144 starts reception at a time after the beginning of the time slot by a delay substantially equal to an expected signal propagation time (according to the clocks of receiving station). Whether distance between transmitting station and intended receiving station is known or unknown, reception is started according to a control signal sent to receiver 144 by station control unit 92. Since a preamble is always received first, synchronization unit 148 acquires the preamble in the received signal, determines a position of the end of the preamble using complex-valued matched filters with pseudorandomly variable coefficients and adjustable length for processing inner and outer synchronizing sequences of the preamble. The lengths of the matched filters for the inner and outer synchronizing sequences in synchronization unit 148 and the lengths of the transmitted inner and outer sequences generated in a preamble generator 130 of a corresponding transmitting station (not shown in FIG. 6) are preferably selected by substantially identical programs based on substantially the same information about communication conditions during a previous time slot. As a result, the lengths of the transmitted inner and outer synchronizing sequences in the received signal are substantially equal to the lengths of their respective matched filters in synchronizing unit 148. During an earlier time slot (preferably the closest preceding time slot with respect to the current or extant time slot) the coefficients of respective matched filters for the inner and outer synchronizing sequences are preferably pseudorandomly selected or generated in the synchronization units 148 of all communication stations in a communication system or network by the substantially the same program that is used for the pseudorandom selection or generation of the inner and outer sequences in the preamble generators 130 of all communication stations in a communication system or network (other communication stations in a communication system or network are not shown in FIG. 6). These measures provide agreement between transmitted inner and outer sequences of the preamble and their respective matched filters within each respective time slot. The output signal of a filter matched with the inner nonlinear PN sequence of a preamble is preferably used for both synchronization and determining communication channel characteristics. In general, during synchronization and subsequent payload data reception (described in connection with FIGS. 3-4) receiver part 140 of communication station 90 performs measurements of current communication conditions for internal use and for dissemination among other communication stations in a communication system or network (not shown in FIG. 6). The results of measurements may be used for various purposes including, by way of example and not by way of limitation, adjustment of lengths of the inner and outer sequences of the preamble in preamble generator 130 and corresponding adjustment of lengths of respective matched filters in synchronization unit 148 of a respective receiving station. They also may be used for optimal selection of spreading or despreading, modulation or demodulation and encoding or decoding techniques used for payload data transmission and reception. The results of measurements and other updated information about communication conditions such as, by way of example and not by way of limitation, positions of stations, directions, speeds and accelerations of their movement (for mobile communication stations), time of day, the number of a current frame and the number of a current time slots within the frame may be stored in station control units 92 of all stations in a communication system or network (not shown in FIG. 6).

When the preamble is acquired and a position of its end is determined, synchronization is completed. When synchronization is completed synchronization unit 148 sends two instructions. The first instruction is sent to switch 150 to connect the first input of despreading unit 152 to FIFO memory 146. The second instruction is sent to RAM control unit 104. In response to the second instruction, RAM control unit 104 generates commands and sends them to RAM 102 and demultiplexer unit 106. RAM 102 provides the required second delay of the spreading sequence and demultiplexer 106 sends the second copy of the spreading sequence to despreading unit 152. The second copy of the spreading sequence is used for despreading of received signal that carry payload data. The second copy of the spreading sequence is sent to the second input of despreading unit 152 through switch 150 from FIFO memory 146. FIFO memory 146 is used for compensating processing delay in synchronization unit 148. Because of delay (the second delay) of the second copy of the spreading sequence in RAM 102, this copy is synchronized with the spreading sequence of the received signal and, therefore, can be used for despreading the received signal. A despread received signal enters demodulator 154 and is demodulated and sent to a decoder 156. Decoder 156 decodes the demodulated signal. The received payload data is sent from decoder 156 to a user or sent elsewhere for further processing. When decryption is necessary, a decrypting unit (not shown in FIG. 6) may be included in the signals processing chain such as, by way of example and not by way of limitation, after decoding unit 156. Receiver part 140 of station 90 stops reception when all payload data has been received.

At the beginning of each time slot, spreading sequence generator 96 (i.e. generator of a virtually infinite complex-valued NN PN spreading sequence) is restarted using a new initialization vector (IV) formed by initialization vector generator 98 during a preceding time slot. Each initialization is preferably triggered by station control unit 92. After initialization, spreading sequence generator 96 starts generation of a fragment of a virtually infinite complex-valued NN PN spreading sequence for the current time slot. The length of the fragment is substantially equal to the time slot length (see FIG. 4). While spreading sequence generator 96 generates the fragment of a spreading sequence during a current or extant time slot, initialization vector generator 98 forms an initialization vector for a succeeding time slot (preferably the next succeeding time slot).

The fragment of spreading sequence is delayed by RAM unit 102 and distributed by demultiplexer unit 106 to spreading unit 126 and despreading unit 152 after appropriate delays. With respect to transmitted signals, the appropriate delay for spreading unit 126 is determined by station control unit 92. With respect to received signals, the appropriate delay for despreading unit 152 is determined by synchronization unit 148.

Changes can be made in the described embodiment of the invention without departing from the spirit and scope of the invention. By way of example and not by way of limitation, although direct sequence spread spectrum systems (DSSS) are described in the foregoing description, it should be understood that the invention may be advantageously employed with frequency-hopping spread spectrum systems without significant modification. By way of further example and not by way of limitation, any communication station in a communication system or network may have only one antenna for both transmitting and receiving operations if different frequencies are used for transmission and reception of signals. By way of still further example and not by way of limitation, other types of digital delay lines different from a dual-port RAM (e.g., RAM unit 102; FIG. 6) may be employed in the invention.

Figure 7:
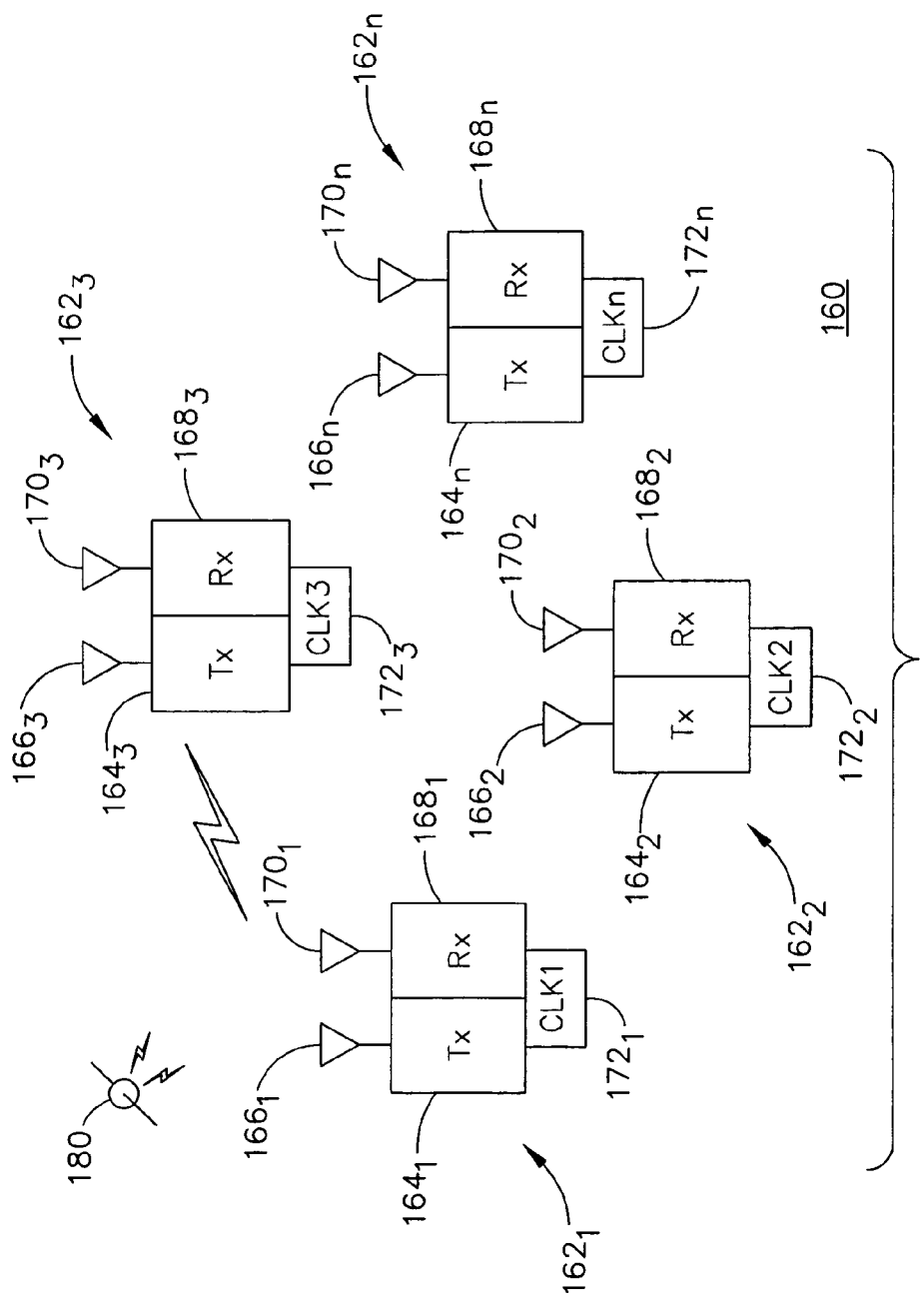
FIG. 7 is a schematic diagram of the system of the present invention.

FIG. 7 is a schematic diagram of the system of the present invention. In FIG. 7, a communication system or network 160 includes a plurality of communication stations $162_1$, $162_2$, $162_3$, $162_n$. The indicator "n" is employed to signify that there can be any number of communication stations in communication system or network 160. The inclusion of four communication stations $162_1$, $162_2$, $162_3$, $162_n$ in FIG. 7 is illustrative only and does not constitute any limitation regarding the number of communication stations that may be included in a communication system or network employing the present invention.

Each respective communication station $162_n$ includes a respective transmit unit $164_n$, transmit antenna $166_n$, receive unit $168_n$, receive antenna $170_n$ and clock unit $172_n$. Thus, communication station $162_1$, includes a transmit unit $164_1$, transmit antenna $166_1$, receive unit $168_1$, receive antenna $170_1$ and clock unit $172_1$ (CLK1). Communication station $162_2$, includes a transmit unit $164_2$, transmit antenna $166_2$, receive unit $168_2$, receive antenna $170_2$ and clock unit $172_2$ (CLK2). Communication station $162_3$, includes a transmit unit $164_3$, transmit antenna $166_3$, receive unit $168_3$, receive antenna $170_3$ and clock unit $172_3$ (CLK3). Communication station $162_n$, includes a transmit unit $164_n$, transmit antenna $166_n$, receive unit $168_n$, receive antenna $170_n$ and clock unit $172_n$ (CLKn).

As described earlier herein, with a TDMA communication system, including a TDMA spread spectrum communication system, guard intervals are necessary in each time slot. The reason for the first or leading guard interval in a time slot relates to clock uncertainties among clocks CLKn of various communicating stations $162_n$ in a communication system or network 160. Reference clocks CLKn of all communication stations $162_n$ that constitute a communication system or network 160 or can potentially join a communication system or network 160 are usually periodically (for example, with period of 1 second) synchronized by signals of GPS (Global Positioning System) satellites 180.

Despite such periodic synchronization from a common source, there is still time uncertainty among communication stations $162_n$ for many reasons. The largest component of the time uncertainty is commonly caused by differing frequency drifts of the reference oscillators in reference clocks CLKn of various communication stations $162_n$. Because of the resulting time uncertainty among various communication stations $162_n$, a transmitter $164_n$ cannot start transmitting immediately at the beginning of a time slot without risking a receiver $168_n$ missing at least some of the transmitted information. To avoid a loss of information transmitted during a time slot, a transmitter $164_n$ should start transmitting (according to its own clock CLKn) only after the end of a first or leading guard interval that exceeds the maximum possible time uncertainty among clocks CLKn of the various communication stations $162_n$. A corresponding receiver $168_n$ should start reception immediately at the beginning of the time slot (according to its own clock CLKn) when distance between transmitter $164_n$ and receiver $168_n$ is unknown. A corresponding receiver $168_n$ should start reception at a delayed time after the beginning of the time slot when distance between transmitter $164_n$ and receiver $168_n$ is known. The delay should be equal to propagation time (according to the receiver's $168_n$ own clock CLKn). Propagation time is, of course, related to the distance between transmitter $164_n$ and receiver $168_n$.

In TDMA communication systems according to the prior art, duration of the first guard interval is selected larger than a maximum possible time uncertainty among stations in a communication system or network. This significantly reduces throughput of the TDMA communication system.

The present invention provides a variable first guard interval. In a time slot that follows directly after synchronization of the clocks CLKn of the various communication stations $162_n$ by GPS signals, duration of the first guard interval is close to zero because possible time differences among stations' clocks are negligible at that time. Thereafter, the first guard interval gradually increases to compensate gradually growing time differences (time uncertainty) among the stations' clocks accumulated slot-by-slot. A linear increase of the first guard interval is a simple and preferred approach that can be recommended. However, other ways of the first guard interval gradual increase can also be used in the invention. The duration of the first guard interval achieves its largest value in the time slot that precedes the next synchronization of the clocks CLKn of the communication stations $162_n$ by the GPS signals because possible time shifts among stations' clocks achieve a maximum value in this time slot. Thus in the present invention, the first guard interval has the length equal to that required according to the prior art only in the last time slot within each GPS synchronization cycle. All other time slots in the invention have shorter first guard intervals. The average length of the first guard intervals in the present invention is two times shorter than the length of the first guard intervals according to the prior art.

A second or ending guard interval at the end of a time slot is required to avoid loss of transmitted information because of two reasons: signal propagation time and time uncertainty among clocks CLKn of various communication stations $162_n$ in a communication system or network 160. A transmitter $164_n$ should stop transmitting before the end of a time slot to take into account propagation time of a transmitted signal and time uncertainty among clocks CLKn of the various communication stations $162_n$. If a transmitter $164_n$ transmits until the end of a time slot, a signal transmitted during a first time slot could reach a receiver $168_n$ at the beginning of the next succeeding time slot, or a signal transmitted at the end of a first time slot according to the clock CLKn of a transmitting station $162_n$ could be transmitted at the beginning of the next succeeding time slot according to the clock CLKn of a receiving station $162_n$. When distance between transmitter $164_n$ and receiver $168_n$ is unknown, the second or ending guard interval should be established as sufficiently long to accommodate the maximum possible propagation time a transmitted signal may take to travel from a transmitter $164_n$ to a receiver $168_n$. Knowledge of the distance between transmitter $164_n$ and receiver $168_n$ allows reduction of the second guard interval so long as the distance is not a maximum.

In prior art TDMA communication systems, the second guard interval is selected to exceed the sum of the maximum possible propagation time and maximum possible time uncertainty in the communication system or network. The present invention provides reduction of both components of second guard interval 28 (FIG. 2): the component related to the time uncertainty among communication stations' clocks and the component related to the propagation time. The invention uses variations of the time uncertainty during each period of stations' clocks synchronization (for example, by GPS signals) for reducing the component of the second guard interval related to time uncertainty among communication stations' clocks. It is done substantially the same way as reduction of the first guard interval. Accumulating and updating information about positions of communication stations $162_n$ and directions, speeds and accelerations of their movement (for mobile communication stations) within each station and dissemination of this information among all stations $162_n$ of communication system or network 160 enable determining the distances and, consequently, propagation times between transmitting and receiving stations. In the present invention, this information is used for reducing the component of the second guard interval related to the signal propagation time.

The reduction of the first and second guard intervals achieved in the invention significantly increases the throughput of TDMA communication systems.

Figure 8:
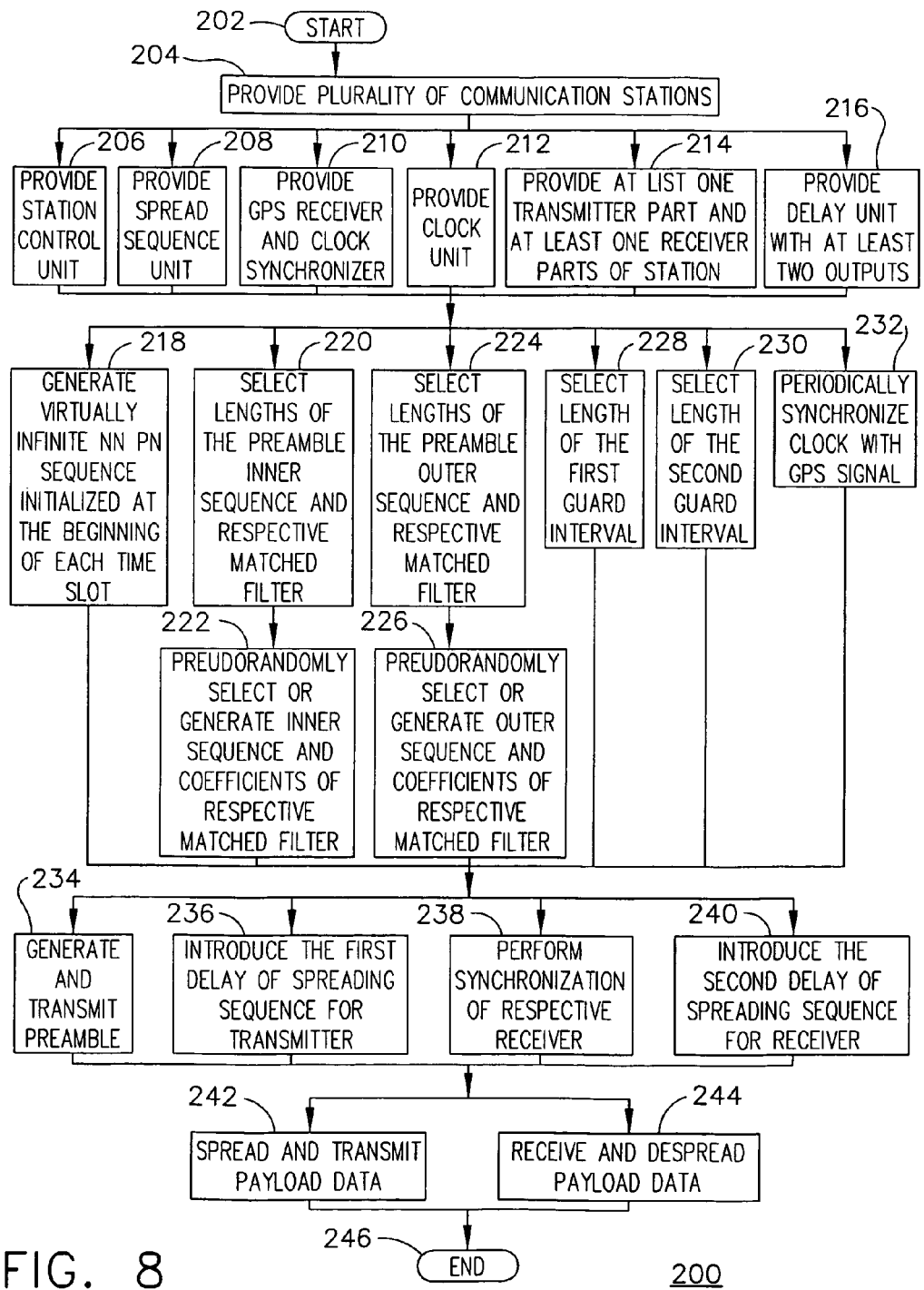
FIG. 8 is a flow chart illustrating the method of the present invention.

FIG. 8 is a flow chart illustrating the method of the present invention. In FIG. 8, a method 200 of slot synchronization in TDMA communication systems with spread spectrum signals begins at a START locus 202. Method 200 continues with the step of providing a plurality of communication stations, as indicated by a block 204. Method 200 continues with the step of, for each respective communication station of the plurality of communication stations, in no particular order: (1) Providing a station control unit, as indicated by a block 206. (2) Providing a spreading sequence originating unit coupled with the station control unit, as indicated by a block 208. Spreading sequence originating unit is shown as a complex-valued NN PN sequence generator tightly connected to initialization vector generator in FIG. 6. (3) Providing a GPS receiver and clock synchronizer as indicated by a block 210. (4) Providing a clock unit controlled by the GPS receiver and clock synchronizer and coupled with all other units as indicated by a block 212. (5) Providing at list one transmitter part and at list one receiver parts of the station as indicated by a block 214. All units of both transmitter and receiver parts of the station are controlled by the station control unit. In principle, each communication station can have several transmitter parts and several receiver parts. Each transmitter part of the station contains preamble (synchronizing sequence) generator and spreading unit among other units. Each receiver part of the station contains synchronizing unit and despreading unit among other units. (6) Providing a delay unit with at list two outputs, as indicated by a block 216. When a station has only one transmitter part and only one receiver part, the first output of the delay unit is connected to the spreading unit of the transmitter part of the station and the second output of the delay unit is connected to the despreading unit of the receiver part of the station. If station has several transmitter parts and several receiver parts, the number of the delay unit outputs is equal to the total number of the transmitter and receiver parts.

Method 200 continues with the step of: (1) Generating virtually infinite NN PN sequence initialized at the beginning of each time slot as indicated by a block 218. (2) Selecting lengths of the preamble inner sequence and respective matched filter as indicated by a block 220. Both lengths of the preamble inner sequence and respective matched filter are selected (or calculated) by substantially identical program in all stations belonging to the same communication system or network. The selection or calculation is based on the expected delay spread of the communication channel. (3) Pseudorandomly selecting or generating inner sequence of the preamble and coefficients of respective matched filter as indicated by a block 222. Both the preamble inner sequence and coefficients of the respective matched filter are selected or generated by substantially identical program in all stations belonging to the same communication system or network. This pseudorandom selection or generation should be performed after selection of the lengths of the preamble inner sequence and respective matched filter (block 220). (4) Selecting lengths of the preamble outer sequence and respective matched filter as indicated by a block 224. Both lengths of the preamble outer sequence and respective matched filter are selected (or calculated) by substantially identical program in all stations belonging to the same communication system or network. The selection or calculation of these lengths is based on the expected signal-to-noise ratio that characterizes communication conditions and the length of the inner sequence determined by block 220. (5) Pseudorandomly selecting or generating outer sequence of the preamble and coefficients of respective matched filter as indicated by a block 226. Both the preamble outer sequence and coefficients of the respective matched filter are selected or generated by substantially identical program in all stations belonging to the same communication system or network. The pseudorandom selection or generation of the preamble outer sequence and coefficients of the respective matched filter should be performed after selection of the lengths of the preamble outer sequence and respective matched filter (block 224). (6) Selecting length of the first guard interval as indicated by a block 228. The selection of the first guard interval is performed based on the time that passed after the closest preceding synchronization of the stations' clocks by GPS signals. (7) Selecting length of the second guard interval as indicated by a block 230. The selection of the second guard interval is performed based on two factors: the time that passed after the closest preceding synchronization of the stations' clocks by GPS signals and distance between transmitting and receiving stations. (8) Periodical synchronizing station clock with GPS signal as indicated by a block 232. Besides GPS signals, other types of signals that that are available for all stations of the communication system or network can be used for the clock synchronization. This periodical synchronization can be carried relatively rarely, for example once in a second, and an interval between two adjacent clock synchronizations can include many time slots and frames. Method 200 continues with the step of: (1) Generating a preamble (synchronizing sequence) in a transmitter part of a communication station of the plurality of communication stations and transmitting this preamble to other communication station of the plurality of communication stations after the end of the first guard interval of a time slot, as indicated by a block 234. (2) Introducing the first delay of spreading sequence for the transmitter part of the station, as indicated by a block 236. The first delay makes it possible for a copy of the complex-valued NN PN sequence, which is used for spreading, to enter the spreading unit of the transmitter part of the station at the instant when transmission of a preamble is completed. (3) Performing synchronization of a respective receiver part of the station, to which preamble has been transmitted, as indicated by a block 238. The synchronization is performed by synchronization unit of a receiver part of the station, to which preamble has been transmitted. (4) Introducing the second delay of spreading sequence for the receiver part of the station, to which preamble has been transmitted, as indicated by a block 240. The second delay makes it possible for a copy of the complex-valued NN PN sequence that is used for despreading to enter the despreading unit of the receiver part of the station at the instant when synchronization is completed.

Method 200 continues with the step of: (1) Spreading and transmitting payload data, as indicated by a block 242. These spreading and transmission are performed by the station that has transmitted preamble at the previous step (block 234). Prior to the spreading and transmission, the input data of the station are encoded, modulated and, if necessary, encrypted. (2) Receiving and despreading data payload data, as indicated by a block 244. The reception and despreading are performed by the station that has been synchronized by the transmitted preamble at the previous step (block 238). After the reception and despreading, the despread signal is demodulated, decoded, if necessary, decrypted. Method 200 terminates at an END locus 246.

Figure 9:
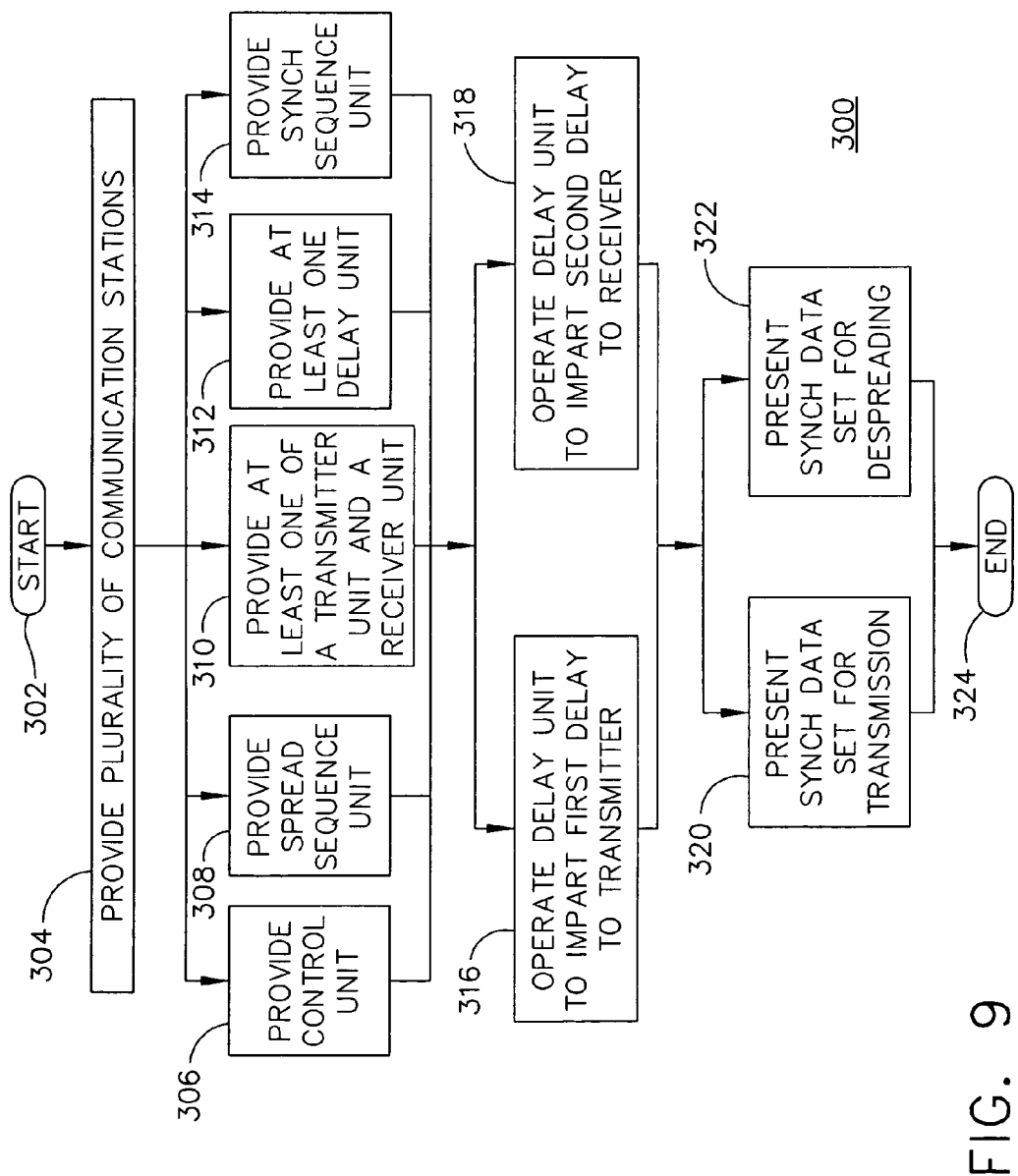
FIG. 9 is a simplified flow chart illustrating the method of the present invention.

FIG. 9 is a simplified flow chart illustrating the method of the present invention. In FIG. 9, a method 300 for effecting signal synchronization for employing a pseudonoise spreading sequence for spreading transmitted information during a plurality of time intervals begins at a START locus 302. Method 300 continues with the step of providing a plurality of communication stations, as indicated by a block 304. Method 300 continues with the step of, for each respective communication station of the plurality of communication stations, in no particular order: (1) Providing a control unit, as indicated by a block 306. (2) Providing a spreading sequence originating unit coupled with the control unit for originating the spreading sequence, as indicated by a block 308. (3) Providing at least one of a transmitter unit and a receiver unit, as indicated by a block 310. The transmitter unit and the receiver unit are coupled with the spreading sequence originating unit and coupled with the control unit. (4) Providing at least one delay unit coupled with the control unit, coupled with the transmitter unit and coupled with the spreading sequence originating unit, as indicated by a block 312. (5) Providing a synchronizing sequence originating unit coupled with the transmitter unit, as indicated by a block 314.

Method 300 continues with the step of, in no particular order: (1) Operating the at least one delay unit to respond to said control unit to impart a first delay to the spreading sequence presented to the transmitter unit, as indicated by a block 316. (2) Operating the at least one delay unit to respond to said control unit to impart a second delay to the spreading sequence presented to the receiver unit, as indicated by a block 318.

Method 300 continues with the step of, in no particular order: (1) Operating the synchronizing sequence originating unit in a first communication station of the plurality of communication stations having a first transmitter unit to present a synchronizing sequence for transmission by the first transmitter unit accompanying spread information transmitted during selected time intervals of the plurality of time intervals, as indicated by a block 320. (2) operating the second receiver unit in a second communication station of the plurality of communication stations to employ the synchronizing sequence in cooperation with the spreading sequence for despreading received the spread information, as indicated by a block 322. Method 200 terminates at an END locus 324.

In its preferred embodiments, he invention includes at least several distinctive features. Use of a relatively short (compared to the time slot length) complex-valued nonlinear pseudonoise (PN) synchronization sequence (preamble) for the alignment of received and reference virtually infinite complex-valued nonlinear nonrecurrent (NN) PN sequences that spread payload data in the transmitters and despread them in the receivers.

Employment of a concatenated complex-valued nonlinear PN sequence with adjustable pseudorandomly selected or generated inner and outer sequences, which are nonlinear PN sequences, as the relatively short preamble.

Providing the same chip rate and modulation technique for the preamble complex-valued inner nonlinear PN sequence and the complex-valued virtually infinite NN PN sequence used for spreading and despreading of payload data.

Independent pseudorandom variation of both inner and outer nonlinear PN sequences of the preamble so that each time slot is synchronized by newly pseudorandomly selected or generated preamble.

Adaptation of the lengths of the preamble inner and outer variable nonlinear PN sequences to the communication conditions.

Selection of the length of the inner nonlinear PN sequence of the preamble slightly longer then expected delay spread of the communication channel impulse response.

Adaptation the overall length of the preamble to the severity of communication conditions by changing the length of its outer nonlinear PN sequence.

Processing the preamble in the receiver by matched filters with pseudorandomly selected or generated coefficients and adjustable length. One of the filters is matched with the inner nonlinear PN sequence of the preamble; another is matched with the outer nonlinear PN sequence of the preamble.

Selection or calculation of the lengths of the preamble inner and outer sequences and respective matched filters by substantially identical program and based on the same information about communication conditions in all stations belonging to the same communication system or network.

Determining of the lengths of the preamble inner and outer sequences and respective matched filters for a current time slot during a previous one.

Pseudorandom selection or generation of the coefficients of the matched filters for the inner and outer sequences in the receivers of all stations comprising a network by the program that is identical to the program used for the pseudorandom selection or generation of the inner and outer sequences in the transmitters of all stations in this network.

Performing selection or generation of the inner and outer sequences and coefficients of the respective matched filters for a current time slot during a previous one.

Calculation of the lengths of the inner and outer sequences and their matched filters for a current frame during the previous one.

Employment of only one generator of the virtually infinite complex-valued NN PN sequence for all independently operating transmitters and receivers of each station that belong to a communication system or network.

Providing appropriate starting time of a fragment of the virtually infinite complex-valued NN PN sequence generated during a current time slot by sending it to both receiver and transmitter parts of the station over a delay unit with two independently controlled outputs (the first output produces the first copy of the sequence used for spreading in the transmitter part of the station, and the second output produces the second copy of the sequence used for despreading the receiver part of the station). If station contains several independent transmitters and receivers, each receiver and each transmitter should have a separate independent output of the delay unit.

Controlling the delay of the first output of the delay unit by the station control unit and the delay of the second output of the delay unit by the synchronization unit of the receiver part of the station. If station contains several independent transmitters and receivers, each output of the delay unit related to a transmitter should be controlled by the station control unit, and each output of the delay unit related to a receiver should be controlled by the synchronization unit of a respective receiver.

Variable $1^{st}$ guard intervals that are set close to zero in a time slot that that follows directly after each GPS synchronization of the reference clocks of all stations in a network and subsequent linear increase of these guard intervals during the periods between adjacent synchronizations of the stations' reference clocks to compensate gradually growing time uncertainty caused by frequency drifts of the stations' reference oscillators.

Variable $2^{nd}$ guard intervals that are minimized, first, by using information about signal propagation time between receivers and corresponding transmitters and, second, by setting the component of the $2^{nd}$ guard intervals caused by the time uncertainty among the among stations' clocks close to zero in a time slot that follows directly after each GPS synchronization of the reference clocks with subsequent linear increase of the component during the periods between adjacent synchronizations of the stations' reference clocks to compensate gradually growing time uncertainty caused by frequency drifts of the stations' reference oscillators.

It is to be understood that, while the detailed drawings and specific examples given describe preferred embodiments of the invention, they are for the purpose of illustration only, that the apparatus and method of the invention are not limited to the precise details and conditions disclosed and that various changes may be made therein without departing from the spirit of the invention which is defined by the following claims:

We claim:

1. A system for effecting signal synchronization for employing a pseudonoise spreading sequence for spreading transmitted information during a plurality of successive time slots; the system comprising: a plurality of communication stations; each respective communication station of said plurality of communication stations comprising:
   (a) a control unit;
   (b) a spreading sequence originating unit coupled with said control unit for originating said spreading sequence;
   (c) at least one of a transmitter unit and a receiver unit; said transmitter unit and said receiver unit being coupled with said spreading sequence originating unit and coupled with said control unit;
   (d) at least one delay unit coupled with said transmitter unit and coupled with said spreading sequence originating unit; said at least one delay unit responding to said control unit for imparting a first delay to said spreading sequence presented to said transmitter unit; said at least one delay unit responding to said control unit for imparting a second delay to said spreading sequence presented to said receiver unit; and (e) a synchronizing sequence originating unit coupled with said transmitter unit; said synchronizing sequence originating unit in a first communication station of said plurality of communication stations having a first transmitter unit presenting a synchronizing sequence for transmission by said first transmitter unit accompanying spread information transmitted during selected time slots of said plurality of time slots; a second receiver unit in a second communication station of said plurality of communication stations employing said synchronizing sequence in cooperation with said spreading sequence for despreading received said spread information.

2. A system for effecting signal synchronization for employing a pseudonoise spreading sequence for spreading transmitted information during a plurality of successive time slots as recited in claim 1 wherein said first delay accommodates parameters associated with a first communication link in which said transmitter unit is involved and wherein second delay accommodates parameters associated with a second communication link in which said receiver unit is involved.

3. A system for effecting signal synchronization for employing a pseudonoise spreading sequence for spreading transmitted information during a plurality of successive time slots as recited in claim 1 wherein said synchronizing sequence originating unit initiates a respective said synchronizing sequence in an extant time slot of said plurality of time slots based upon an initializing directive; said initializing directive having been developed during a time slot occurring earlier than said extant time slot.

4. A system for effecting signal synchronization for employing a pseudonoise spreading sequence for spreading transmitted information during a plurality of successive time slots as recited in claim 3 wherein said synchronizing sequence originating unit employs a mathematical algorithm for generating said synchronizing sequence; said synchronizing sequence originating unit for each respective communication station of said plurality of communication stations employing substantially the same mathematical algorithm and substantially the same initializing directive for originating substantially the same synchronizing sequence.

5. A system for effecting signal synchronization for employing a pseudonoise spreading sequence for spreading transmitted information during a plurality of successive time slots as recited in claim 3 wherein said synchronizing sequence originating unit selects said synchronizing sequence from a plurality of stored said synchronizing sequences retained in a data store; said synchronizing sequence originating unit for each respective communication station of said plurality of communication stations employing substantially the same plurality of stored said synchronizing sequences and substantially the same initializing directive for originating substantially the same synchronizing sequence.

6. A system for effecting signal synchronization for employing a pseudonoise spreading sequence for spreading transmitted information during a plurality of successive time slots as recited in claim 1 wherein at least one of a leading guard interval and an ending guard interval are established for at least said selected time slots; said leading guard interval establishing a first period of substantially no activity by a transmitter unit substantially at the beginning of a respective said time slot; said ending guard interval establishing a second period of substantially no activity by a transmitter unit substantially at the end of a respective said time slot.

7. A system for effecting signal synchronization for employing a pseudonoise spreading sequence for spreading transmitted information during a plurality of successive time slots as recited in claim 1 wherein said synchronizing sequence is shorter than said spreading sequence.

8. A system for effecting signal synchronization for employing a pseudonoise spreading sequence for spreading transmitted information during a plurality of successive time slots as recited in claim 7 wherein at least one of said spreading sequence and said synchronizing sequence is adjustable to accommodate varied operating conditions.

9. A system for effecting signal synchronization for employing a pseudonoise spreading sequence for spreading transmitted information during a plurality of successive time slots as recited in claim 7 wherein said spreading sequence and said synchronizing sequence are configured using substantially similar characteristics; at least one of said characteristics being chip rate.

10. An apparatus for use in a communication system employing a pseudonoise spreading sequence for spreading transmitted information during a plurality of time slots; the apparatus being deployed in a plurality of substantially similar units within said communication system; each respective unit of said plurality of units comprising:
  (a) a control unit;
  (b) a spreading sequence originating unit coupled with said control unit for originating said spreading sequence;
  (c) at least one of a transmitter unit and a receiver unit; said transmitter unit and said receiver unit being coupled with said spreading sequence originating unit and coupled with said control unit;
  (d) at least one delay unit coupled with said transmitter unit and coupled with said spreading sequence originating unit; said at least one delay unit responding to said control unit for imparting a first delay to said spreading sequence presented to said transmitter unit; said at least one delay unit responding to said receiver unit for imparting a second delay to said spreading sequence presented to said receiver unit; and
  (e) a synchronizing sequence originating unit coupled with said transmitter unit; said synchronizing sequence originating unit in a first unit of said plurality of units having a first transmitter unit presenting a synchronizing sequence for transmission by said first transmitter unit accompanying spread information transmitted during selected time slots of said plurality of time slots; a second receiver unit in a second unit of said plurality of units employing said synchronizing sequence in cooperation with said spreading sequence for despreading received said spread information.

11. An apparatus for use in a communication system employing a pseudonoise spreading sequence for spreading transmitted information during a plurality of time slots as recited in claim 10 wherein said synchronizing sequence originating unit initiates a respective said synchronizing sequence in an extant time slot of said plurality of time slots based upon an initializing directive; said initializing directive having been developed during a time slot occurring earlier than said extant time slot.

12. An apparatus for use in a communication system employing a pseudonoise spreading sequence for spreading transmitted information during a plurality of time slots as recited in claim 11 wherein said synchronizing sequence originating unit employs a mathematical algorithm for generating said synchronizing sequence; said synchronizing sequence originating unit for each respective communication station of said plurality of communication stations employing substantially the same mathematical algorithm and substantially the same initializing directive for originating substantially the same synchronizing sequence.

13. An apparatus for use in a communication system employing a pseudonoise spreading sequence for spreading transmitted information during a plurality of time slots as recited in claim 11 wherein said synchronizing sequence originating unit selects said synchronizing sequence from a plurality of stored said synchronizing sequences retained in a sequence store; said synchronizing sequence originating unit for each respective communication station of said plurality of communication stations employing substantially the same plurality of stored said synchronizing sequences and substantially the same initializing directive for originating substantially the same synchronizing sequence.

14. An apparatus for use in a communication system employing a pseudonoise spreading sequence for spreading transmitted information during a plurality of time slots as recited in claim 10 wherein at least one of a leading guard interval and an ending guard interval are established for at least said selected time intervals; said leading guard interval establishing a first period of substantially no activity by a transmitter unit substantially at the beginning of a respective said time interval; said ending guard interval establishing a second period of substantially no activity by a transmitter unit substantially at the end of a respective said time slot.

15. An apparatus for use in a communication system employing a pseudonoise spreading sequence for spreading transmitted information during a plurality of time slots as recited in claim 10 wherein said synchronizing sequence is shorter than said spreading sequence.

16. A method for effecting signal synchronization for employing a pseudonoise spreading sequence for spreading transmitted information during a plurality of time slots; the method comprising the steps of:
  (a) providing a plurality of communication stations;
  (b) for each respective communication station of said plurality of communication stations, in no particular order:
    (1) providing a control unit;
    (2) providing a spreading sequence originating unit coupled with said control unit for originating said spreading sequence;
    (3) providing at least one of a transmitter unit and a receiver unit; said transmitter unit and said receiver unit being coupled with said spreading sequence originating unit and coupled with said control unit;
    (4) providing at least one delay unit coupled with said control unit, coupled with said transmitter unit and coupled with said spreading sequence originating unit; and
    (5) providing a synchronizing sequence originating unit coupled with said transmitter unit;
  (c) in no particular order:
    (1) operating said at least one delay unit to respond to said control unit to impart a first delay to said spreading sequence presented to said transmitter unit;
    (2) operating said at least one delay unit to respond to said receiver unit to impart a second delay to said spreading sequence presented to said receiver unit; and
  (d) in no particular order:
    (1) operating said synchronizing sequence originating unit in a first communication station of said plurality of communication stations having a first transmitter unit to present a synchronizing sequence for transmission by said first transmitter unit accompanying spread information transmitted during selected time slots of said plurality of time slots; and (2) operating said second receiver unit in a second communication station of said plurality of communication stations to employ said synchronizing sequence, in cooperation with said spreading sequence for despreading received said spread information.

17. A method for effecting signal synchronization for employing a pseudonoise spreading sequence for spreading transmitted information during a plurality of time slots as recited in claim 16 wherein said synchronizing sequence originating unit initiates a respective said synchronizing sequence in an extant time slot of said plurality of time slots based upon an initializing directive; said initializing directive having been developed during a time slot occurring earlier than said extant time slot.

18. A method for effecting signal synchronization for employing a pseudonoise spreading sequence for spreading transmitted information during a plurality of time slots as recited in claim 17 wherein said synchronizing sequence originating unit employs a mathematical algorithm for generating said synchronizing sequence; said synchronizing sequence originating unit for each respective communication station of said plurality of communication stations employing substantially the same mathematical algorithm and substantially the same initializing directive for originating substantially the same synchronizing sequence.

19. A method for effecting signal synchronization for employing a pseudonoise spreading sequence for spreading transmitted information during a plurality of time slots as recited in claim 17 wherein said synchronizing sequence originating unit selects said synchronizing sequence from a plurality of stored said synchronizing sequences retained in a data store; said synchronizing sequence originating unit for each respective communication station of said plurality of communication stations employing substantially the same plurality of stored said synchronizing sequences and substantially the same initializing directive for originating substantially the same synchronizing sequence.

20. A method for effecting signal synchronization for employing a pseudonoise spreading sequence for spreading transmitted information during a plurality of time slots as recited in claim 16 wherein said synchronizing sequence is shorter than said spreading sequence.

* * * * *